US00RE46533E

(19) United States
(12) Reissued Patent
Breed et al.

(10) Patent Number: US RE46,533 E
(45) Date of Reissued Patent: Sep. 5, 2017

(54) FILM AIRBAGS

(71) Applicant: Automotive Technologies International, Inc., Boonton, NJ (US)

(72) Inventors: David S Breed, Miami Beach, FL (US); Wendell C Johnson, San Pedro, CA (US); Ryan H Breed, Laguna Niguel, CA (US); Vittorio Castelli, Yorktown Heights, NY (US)

(73) Assignee: Automotive Technologies International, Inc., Miami Beach, FL (US)

(21) Appl. No.: 14/960,514

(22) Filed: Dec. 7, 2015

Related U.S. Patent Documents

Reissue of:
(64) Patent No.: 7,820,566
Issued: Oct. 26, 2010
Appl. No.: 12/124,819
Filed: May 21, 2008

U.S. Applications:
(60) Provisional application No. 60/939,220, filed on May 21, 2007, provisional application No. 60/991,874, filed on Dec. 3, 2007.

(51) Int. Cl.
*D03D 15/00* (2006.01)
*B60R 21/235* (2006.01)
*D03D 1/02* (2006.01)

(52) U.S. Cl.
CPC ..... *B60R 21/235* (2013.01); *D03D 1/02* (2013.01); *D03D 15/0088* (2013.01);
(Continued)

(58) Field of Classification Search
CPC ..... B60R 21/235; B60R 2021/23542; B60R 2021/23561; B60R 2021/23595; D03D 1/02; D03D 15/0088; Y10T 442/3041
See application file for complete search history.

(56) References Cited

U.S. PATENT DOCUMENTS 3,003,304 A 10/1961 Rasmussen
3,322,613 A 5/1967 Rasmussen
(Continued)

FOREIGN PATENT DOCUMENTS

EP 0344318 A1 12/1989
EP 0489320 A1 11/1991
(Continued)

OTHER PUBLICATIONS

Examination Report for AU2009248992 dated Jan. 25, 2013.
(Continued)

*Primary Examiner* — Elizabeth McKane
(74) *Attorney, Agent, or Firm* — Brian Roffe

(57) ABSTRACT

Inflatable airbag for a vehicle which is deployed in the event of an accident involving the vehicle to provide protection for an occupant of the vehicle includes a plurality of ribbons coupled together to define an enclosed, fluid-retaining space and a layer of film laminated on at least one of an outer side of the woven ribbons and an inner side of the ribbons. The ribbons may be made from polypropylene, polyethylene, polyester or polyamide and the layers of film may be made from polyethylene, polyurethane, polyester or polyamide. The ribbons and layers of film may be made of the same or different materials.

11 Claims, 16 Drawing Sheets

(52) U.S. Cl.
CPC ..... *B60R 2021/23542* (2013.01); *B60R 2021/23561* (2013.01); *B60R 2021/23595* (2013.01); *Y10T 442/3041* (2015.04)

(56) References Cited

U.S. PATENT DOCUMENTS

| | | | | |
|---|---|---|---|---|
| 3,713,942 | A | 1/1973 | Kim | |
| 3,746,608 | A | 7/1973 | Takahashi | |
| 3,864,198 | A | 2/1975 | Jackson | |
| 3,985,599 | A | 10/1976 | Lepoutre et al. | |
| 4,039,364 | A | 8/1977 | Rasmussen | |
| 4,076,121 | A | 2/1978 | Clayton et al. | |
| 4,084,028 | A | 4/1978 | Rasmussen | |
| 4,407,877 | A | 10/1983 | Rasmussen | |
| 5,205,650 | A | 4/1993 | Rasmussen | |
| 5,333,568 | A | 8/1994 | Meldner et al. | |
| 5,505,485 | A | 4/1996 | Breed | |
| 5,607,182 | A * | 3/1997 | Nelsen | B60R 21/231 280/728.1 |
| 5,653,464 | A | 8/1997 | Breed et al. | |
| 5,678,851 | A | 10/1997 | Saito et al. | |
| 5,746,446 | A | 5/1998 | Breed et al. | |
| 5,765,867 | A | 6/1998 | French | |
| 5,863,068 | A | 1/1999 | Breed | |
| 6,112,689 | A | 9/2000 | Baudet | |
| 6,142,520 | A | 11/2000 | Iino et al. | |
| 6,149,194 | A | 11/2000 | Breed et al. | |
| 6,250,668 | B1 | 6/2001 | Breed et al. | |
| 6,265,047 | B1 | 7/2001 | Chapuis et al. | |
| 6,370,475 | B1 | 4/2002 | Breed et al. | |
| 6,405,132 | B1 | 6/2002 | Breed et al. | |
| 7,040,653 | B1 | 5/2006 | Breed | |
| 7,085,637 | B2 | 8/2006 | Breed et al. | |
| 7,202,776 | B2 | 4/2007 | Breed | |
| 7,243,946 | B2 | 7/2007 | Stevens et al. | |
| 7,866,688 | B2 | 1/2011 | Basten | |
| 7,900,954 | B2 | 3/2011 | Salun | |
| 8,348,303 | B1 | 1/2013 | Roring et al. | |
| 8,348,305 | B2 | 1/2013 | Naruse et al. | |
| 8,388,018 | B2 | 3/2013 | Fechner | |
| 8,434,784 | B2 | 5/2013 | Honda et al. | |
| 8,801,033 | B2 | 8/2014 | Breed | |
| 8,822,357 | B2 | 9/2014 | Breed et al. | |
| 8,998,247 | B2 | 4/2015 | Hoeing et al. | |
| 9,039,038 | B2 | 5/2015 | Breed | |
| 9,120,459 | B2 | 9/2015 | Rick | |
| 9,157,173 | B2 * | 10/2015 | Westoby | D01D 5/426 |
| 2002/0135160 | A1 | 9/2002 | Lorenz | |
| 2003/0060104 | A1 | 3/2003 | Veiga | |
| 2004/0247857 | A1 | 12/2004 | Sikorski et al. | |
| 2006/0166577 | A1 * | 7/2006 | Rashed | D03D 1/00 442/1 |
| 2006/0192373 | A1 | 8/2006 | Manley | |
| 2006/0252322 | A1 | 11/2006 | DeBenedictis et al. | |
| 2007/0108752 | A1 | 5/2007 | Eckert et al. | |
| 2007/0138768 | A1 | 6/2007 | Miwa et al. | |
| 2007/0138769 | A1 | 6/2007 | Miwa et al. | |
| 2007/0145724 | A1 | 6/2007 | Miwa et al. | |
| 2010/0117339 | A1 | 5/2010 | Roring et al. | |

FOREIGN PATENT DOCUMENTS

| | | | |
|---|---|---|---|
| GB | 2331955 | A | 6/1999 |
| JP | 8-301044 | | 11/1996 |
| KR | 1020020029759 | | 4/2002 |
| WO | 01/15941 | | 3/2001 |
| WO | 2004106120 | A1 | 12/2004 |
| WO | 2006086247 | A2 | 8/2006 |

OTHER PUBLICATIONS

Response to Examination Report for AU2009248992 dated Feb. 9, 2014.
Extended European Search Report for EP 09751540.7 dated Jan. 15, 2013.
Examination Report for GB1021737.0 dated Jan. 4, 2012.
Response to Examination Report for GB1021737.0 dated Mar. 2, 2012.
Response to European Search Report for EP 09751540.7 dated Aug. 6, 2013.
International Search Report and Written Opinion for PCT/US2011/057878 dated May 21, 2012.
International Search Report dated Nov. 20, 2009.
Written Opinion of International Search Authority dated Nov. 20, 2009.
Abstract of JP 8-301044.

* cited by examiner

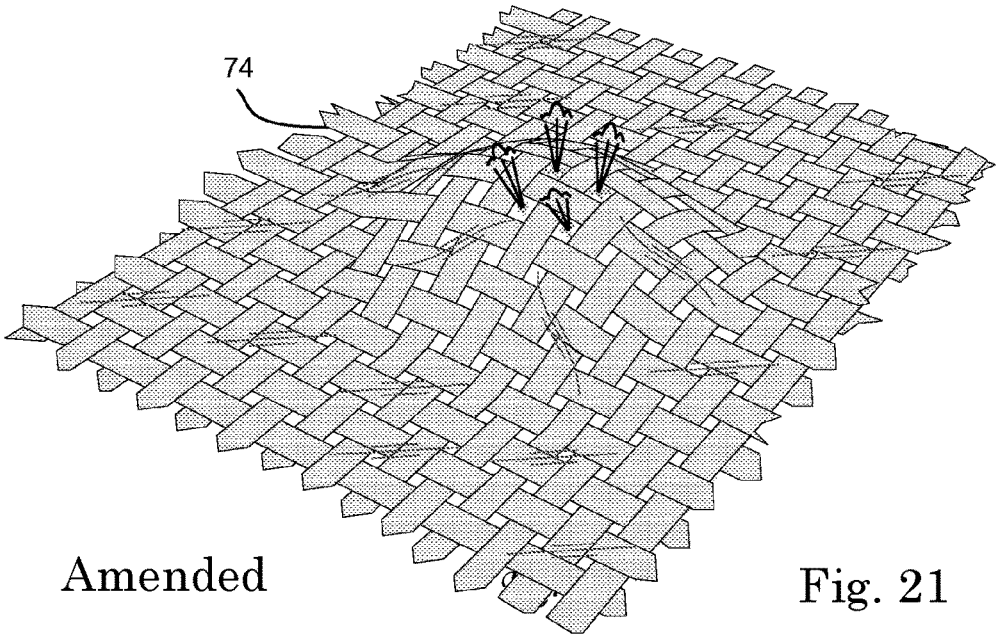
Amended
Fig. 21

FILM AIRBAGS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application *is a reissue of U.S. patent application Ser. No. 12/124,819 filed May 21, 2008, now U.S. Pat. No. 7,820,566, which* claims priority of U.S. provisional patent application Ser. No. 60/939,220 filed May 21, 2007, *now expired,* and U.S. provisional patent application Ser. No. 60/991,874 filed Dec. 3, 2007, *now expired,* both of which are incorporated by reference herein.

FIELD OF THE INVENTION

The present invention relates generally to a comprehensive vehicular safety system which will reduce and possibly eliminate injuries and fatalities arising from vehicular accidents. In particular, the present invention relates to a comprehensive safety system that comprises airbags made from plastic film.

The present invention also relates generally to a method for reducing and possibly eliminating injuries and fatalities arising from vehicular accidents.

BACKGROUND OF THE INVENTION

More than 10 years ago, it was realized that airbags and other forms of passive safety were not likely to save a large portion of the more than 40,000 fatalities that were still occurring annually on roadways in the United States and the 1.2 million annual fatalities worldwide. It was thought that in order to solve this problem, the operation of road vehicles had to be converted to a process from a project. A project by nature has uncertainty. A project is something that is new and which has never before been done and therefore it can be expected that events will arise which will delay the project, increase its costs, and/or cause the project to completely fail.

Modern manufacturing is based on the premise that the manufacture of a product is a process. The process should be designed to manufacture the product over and over again going through the same steps and therefore there should be no uncertainty. In manufacturing, one frequently hears the phrase "100% good parts, 100% of the time". This view of manufacturing began with Deming and was used by Japan to propel it to be one of the highest quality manufacturing country in the world. This concept has now been more fully developed in the Six Sigma® methodology wherein realizing that whereas no process is in fact perfect, it is nevertheless the goal of a process to continue to reduce the variation around a nominal value so that it trends toward perfection where failures are measured in parts per million.

This thinking led to the concept of the Road to Zero Fatalities® or RtZF®, as disclosed in U.S. Pat. Nos. 6,370,475, 6,405,132, 7,085,637, and 7,202,776, among others, which is a project of Intelligent Technologies International, Inc. to achieve a process for driving automobiles that tends toward perfection through eliminating vehicular accidents.

In devising a suite of technologies for RtZF®, those technologies that had the capability of approaching perfection were chosen. Similarly, in manufacturing, a machine or sub-process that was known to produce a bad part 1% of the time is not selected for use. Similarly, in choosing a suite of technologies, a technology that would not work successfully ~100% of the time would not be selected for use. For example, the use of vision systems as the primary technology to guide a vehicle down a roadway was discarded early in the development since the roadway is not always visible. Specifically, in the presence of fog, rain and snow, it is frequently impossible to see the lane markers on a road and on most roads on which accidents occur, the lane markings are defective and/or absent.

The Road to Zero Fatalities® system has received positive responses from all those to whom it has been presented but, primarily for political reasons, its implementation has been slow. Although one major automobile manufacturer has adopted this concept as their corporate plan, unfortunately the Federal Highway department is committed to another approach involving placing DSRC transceivers along the roadways in the United States. One opinion is that they have chosen an infrastructure intensive solution because the FHWA needs such a project to justify their ongoing existence. Now that the 50,000 miles of the federal highway system have been constructed, the FHWA is in search of a project to keep their employees employed. The program that is planned is to place DSRC receivers periodically on all of the federal highways in the United States. This would essentially be a construction of a mini-ubiquitous network that could compete, for example, with WiMAX or other ubiquitous internet systems that are rapidly moving toward widespread deployment in several countries around the world. The costs of this project for the federal highway system is in the tens to hundreds of billions of dollars and would require a significant ongoing maintenance expense. There are not believed to be any plans to place these transponders on the remainder of the 4.2 million miles of roadway where the majority of the fatal accidents occur, primarily because the cost would be astronomical.

In light of the foregoing, a comprehensive safety system is needed as an intermediate step which will prevent vehicular accidents and even if such accidents occur, prevent injuries from arising from such accidents until the RtZF® can be deployed. Although the entire system is briefly described herein, the focus of this disclosure will be limited to one part of the system, namely film airbags.

All of the patents, patent applications, technical papers and other references mentioned anywhere herein are incorporated by reference herein in their entirety. No admission is made that any or all of these references are prior art and indeed, it is contemplated that they may not be available as prior art when interpreting 35 U.S.C. §102, 103 in consideration of the claims of the present application.

OBJECTS AND SUMMARY OF THE INVENTION

It is an object of the present invention to provide a new and improved comprehensive vehicular safety system.

It is another object of the present invention to provide a new and improved comprehensive safety system which will prevent most if not all vehicular accidents and even if such accidents occur, prevent most if not all injuries from arising from such accidents.

It is another object of this invention to provide plastic film airbags that substantially reduce the cost and improve the performance of passive safety systems.

In order to achieve one or all of these objects and possibly others, a comprehensive airbag safety system in accordance with the invention includes three main parts, namely, an anticipatory crash sensor that is capable of reliably anticipating a crash before the crash occurs, airbags preferably made from thin plastic film which will be deployed to entirely fill the interior of the vehicle once the sensor has anticipated the crash, and a system which uses air from within the passenger compartment to inflate the airbags and thereby prevent ear injuries, windows being broken, and/or doors being forcibly opened. Such a system may include aspirated inflators.

More particularly, one embodiment of an inflatable airbag for a vehicle which is deployed in the event of an accident involving the vehicle to provide protection for an occupant of the vehicle in accordance with the invention includes a plurality of ribbons coupled together to define an enclosed, fluid-retaining space and a layer of film laminated on at least one of an outer side of the woven ribbons and an inner side of the ribbons. The ribbons may be made from polypropylene, polyethylene, polyester or polyamide and the layers of film may be made from polyethylene, polyurethane, polyester or polyamide. The ribbons and layers of film may be made of the same or different materials.

In one embodiment, the ribbons include a first set of ribbons oriented in a first direction and a second set of ribbons oriented in a second direction different than the first direction. The first and second sets of ribbons are attached together, e.g., woven together. Additional sets of ribbons oriented in different directions may also be provided.

In one embodiment, the ribbons are formed in separate pieces and an elastomer is arranged at seams at which the pieces are coupled together to form the space. The elastomer may be polyurethane and/or part of the pieces of airbag material.

The ribbons may be coupled together to define various types of airbags, including but not limited to a side curtain airbag, a knee airbag, and a frontal impact airbag.

A method for forming an inflatable airbag for a vehicle in accordance with the invention includes coupling a plurality of ribbons together to define an enclosed, fluid-retaining space and laminating a layer of film on at least one of an outer side of the woven ribbons and an inner side of the ribbons. The same variations to the airbag described above can be applied to this method as well.

Another method for forming an airbag includes providing a plurality of pieces of airbag material, the pieces having substantially the same thickness and composition, and joining the pieces together at seams using an elastomer such that the elastomer constitutes a bonding agent for joining the pieces of material together and stress at the seams is distributed along the seams and possibly into the seams. The elastomer may be polyurethane and/or part of the pieces of airbag material.

A method for forming a pure film airbag in accordance with the invention includes providing at least two uniaxially oriented films, each of the films being stretched in a single direction to provide the uniaxial orientation and each of the films having a different orientation direction such that the films are at a non-parallel angle to one another, and weakly laminating the films together. The orientation direction of the films may be perpendicular to one another. This airbag may be made only from film, i.e., a pure film airbag.

BRIEF DESCRIPTION OF THE DRAWINGS

The following drawings are illustrative of embodiments of the systems developed or adapted using the teachings of these inventions and are not meant to limit the scope of the invention as encompassed by the claims.

FIG. 21 is a view of the material of FIGS. 20A, 20B and 20C failing under excessive pressure within the bag illustrating the ability of the ribbons to act together to resist tears.

DETAILED DESCRIPTION OF THE INVENTION

Comprehensive Vehicle Safety System

Figure 1:
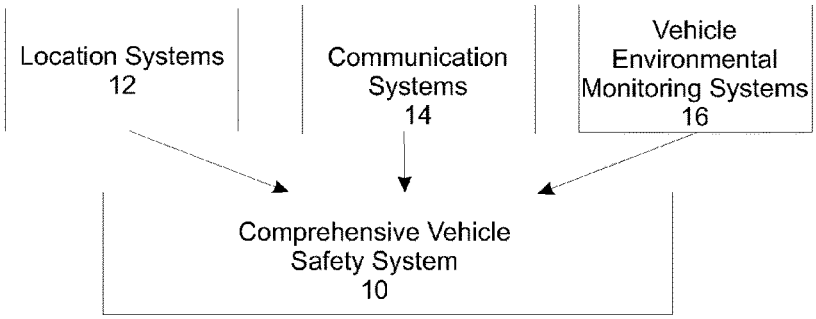
FIG. 1 is a schematic of a comprehensive vehicular safety system in accordance with the invention.

Referring to the accompanying drawings wherein like reference numerals refer to the same or similar elements, FIG. 1 shows basic elements applied in a comprehensive vehicular safety system 10 in accordance with the invention. Namely, the suite of technologies selected as parts of the safety system fall into the categories of location systems 12, communications systems 14 and vehicle environment monitoring systems 16.

Considering first the location systems 12, based on available technology, a vehicle can know its precise location on the surface of the earth to an accuracy of about 8-10 cm measured as the ratio of the standard deviation to the mean. This number has been demonstrated to be achievable using wide area differential GPS (WADGPS). In addition, the location of the roadway and all other infrastructure objects can also be known very accurately. This can be achieved using local area differential GPS during the process of mapping roads on which vehicles may travel. This may involve placing temporary local area differential GPS stations approximately every 30 km while the mapping is undertaken. They would be moved for the each stage of mapping and thus are not part of the infrastructure. Rough cost estimates for mapping the entire 4.2 million miles of roads in the United States are considerably less than the Federal Highway Department is estimating it will cost to implement DSRC (Dedicated Short Range Communication) into the infrastructure on the 50,000 miles of the Federal Highway System. DSRC is unnecessary under the Road to Zero Fatalities® concept.

Although GPS is not a 100% available system, there are continuous improvement activities ongoing that will cause it to tend toward perfection. It is known, for example, that sunspots can temporarily affect GPS operation and that it is subject to malicious jamming or other interference.

Since each RtZF® vehicle will actually be guided by an accurate low cost inertial measurement unit (IMU), the loss of many seconds of DGPS data will not seriously disrupt the system. Nevertheless, the continuous improvement nature of the Road to Zero Fatalities® system involves using the around-vehicle monitoring and communication systems to additionally permit the vehicle to accurately know its location based on fixed objects in the infrastructure and/or relative location measurements of other vehicles and vehicle to vehicle or vehicle to infrastructure communication systems. This monitoring system can be the same system as the anticipatory sensor system that will be described in more detail below.

Consider now the communications systems 14. The communication part of the safety system 10 involves two types of communications depending on the time available for the communication. In the first case, a delay of a few seconds is not significant whereas when two vehicles are about to collide, milliseconds are critical. The solution to the first case is the planned function for the FHWA infrastructure enablement of DSRC. For the Road to Zero Fatalities® system, a ubiquitous broadband network is expected to be in place covering nearly 100% of the United States long before the infrastructure DSRC is in place, thereby making infrastructure DSRC obsolete. The worldwide rapid implementation of WiMAX, for example, will approach the level required long before it is needed by the RtZF® systems. Messages sent by this method include roadway condition, traffic control information, traffic management information, weather information, accident information, congestion information, the existence and location of animals, rocks or debris on the highway and any other information that could affect the driving process causing it to degrade or deteriorate.

Neither the DSRC nor WiMAX are currently fast enough to permit communication between two vehicles that are on a collision path. For this, immediate communication is essential. The problem is enabling each vehicle to know which of the perhaps 1000 broadcasting vehicles to listen to. This can be accomplished by using the transmission code as an indicator of the location of the vehicle. Since all vehicles would know their precise location and through accurate maps would also know those parts of the roadway that could conceivably contain a threatening vehicle, the number of vehicles that would be monitored by direct vehicle-to-vehicle communication would be small. This concept is disclosed in U.S. Pat. No. 6,768,944, and related applications and patents, all of which are incorporated by reference herein.

Monitoring system 16 for monitoring the environment around a vehicle will be discussed below. Briefly, the goal of the monitoring system 16 is to prevent accidents with vehicles that are not equipped with the RtZF® system thus are not able to communicate and animals, pedestrians, objects on the roadway etc.

Passive safety systems have been and are still being developed, including frontal impact airbag systems and side impact airbag systems. The focus below will be primarily on frontal impact airbag systems but the invention of course is applicable to accidents which impact the vehicle from any direction such as the side and rear. It is particularly applicable to side impacts which are the most difficult accidents to ameliorate due to the absence of substantial protecting structure on the side of a vehicle and the limited sensing time available. Rear impacts, although not usually fatal, are the most costly of all accidents. The biggest use of hospital beds in America is for victims of automobile accidents and the largest percentage of those are from rear impacts.

In conventional systems today, an accident is sensed by one or more reactive crash sensors after it has begun and thus there is a very tight time window for sensing the crash and deploying an occupant restraint. Typically, for a 30 mph frontal barrier crash, approximately 20 ms are permitted for a sensor to initiate airbag deployment. For side impacts, this sensing time is approximately 5 ms for the standard side impact crash test.

While the airbag is deploying, an occupant begins moving toward the airbag and frequently impacts it during deployment causing injuries and sometimes fatalities. Many techniques, such as occupant classification and position sensors and adaptive or friendly airbags, are being developed and applied to minimize airbag-induced injuries. Nevertheless, while the vehicle is being decelerated at about 20 Gs, in a 30 mph frontal barrier impact, due to this timing problem, the occupant can be decelerated by as much as 40 or more Gs by the airbag. This can translate into a 6000 pound force on the occupant depending on his or her upper body mass. Additionally, the occupant runs the risk of impacting other occupants or fixed objects within the vehicle. If the accident can be reliably anticipated before impact, the restraints can be deployed before the accident and before the occupant begins moving which will significantly reduce these injuries. The occupant deceleration then becomes the same as the vehicle average deceleration.

If the vehicle is filled with air bags, then each occupant can be held in his or her pre-crash position and therefore not impact with other occupants or other parts of the vehicle during the crash. This would eliminate the so-called "second impact".

In consideration of the foregoing, a comprehensive safety system 10 in accordance with the invention includes one or more sensors which sense an accident before it happens (anticipatory sensors) and thin-film plastic airbags which deploy throughout the vehicle, each either prior to or simultaneous with the accident. These airbags should stop deploying when they contact an occupant, or otherwise have their continued inflation adjusted or controlled based on contact with the occupant. In this regard, known techniques to sense contact between a deploying airbag and an occupant may be used in the invention, including those disclosed in U.S. patent application Ser. No. 11/456,879 filed Jul. 12, 2006.

The plastic airbags should also be thin and lightweight to minimize packaging problems and airbag slap injuries. Finally, the vehicle cabin air should be used to inflate the airbags in order to prevent ear damage and windows from being broken and doors being forced open when the airbags deploy.

There are several candidate technologies for anticipatory sensors each with some advantages and disadvantages. These include radar, ultrasound, visual optical systems, laser range scanners, or a combination of these technologies. In a preferred embodiment of the invention, an optical system operating in the eye-safe part of the electromagnetic spectrum with a wavelength greater than 1.4 μm is used. There are several candidate imagers; however, a preferred one is a specially doped CMOS design which is created to increase the sensitivity to infrared radiation in the eye-safe part of the electromagnetic spectrum. Such an imager is available from the Institute fur Mikroelektronik, Stuttgart, Germany. Although the imager can be a high dynamic range or active pixel imager, this is not necessary. The imager can have a notch filter centered at 1.5 μm.

The illuminator may be a pulse modulated approximately 1.5 μm LED having a peak power on the order of 10-100 watts. It is an important fact that the sun's emissions in the vicinity of 1.5 μm measured at sea level are 10% of that of the visual part of the spectrum (0.5-0.8 μm). In addition, there are wavelengths very near 1.5 μm where the solar radiation is much less than at 1.5 μm and therefore optimization after field tests may dictate moving the wavelength slightly up or down from 1.5 μm. This wavelength is still sufficiently short as to permit good images to be obtained. Of key importance is that it does not injure human eyes thus permitting a significant increase in emitted power. If desired, however, the reflected energy can be monitored and the transmitted power density controlled to a lever to provide adequate but not excessive illumination. Since this adjustment can occur within a fraction of a millisecond to several milliseconds, a reflection from a nearby object should it be a human can be measured and the transmitted power controlled before the illumination strikes the eyes of a pedestrian, for example.

Since it is desired to ensure that only those reflections from transmissions from the host vehicle having the illumination source are imaged, it is important that the imager not be confused by transmissions from other vehicles. Therefore, the timing of the pulse transmissions can be based on the GPS location of the vehicle. Since a pulse width is contemplated to be on the order of about 10 to 100 nanoseconds, there is the opportunity for many vehicles to be simultaneously emitting without those emissions being captured by the host vehicle. Thus a portion of a sub-second can be divided based on GPS location such that nearby vehicles are not simultaneously transmitting.

Spatial light monitors that can be used to control the reception and/or transmission of pulses can operate up to about 10 GHz which is at least two orders of magnitude faster than needed for this application.

Figure 2:
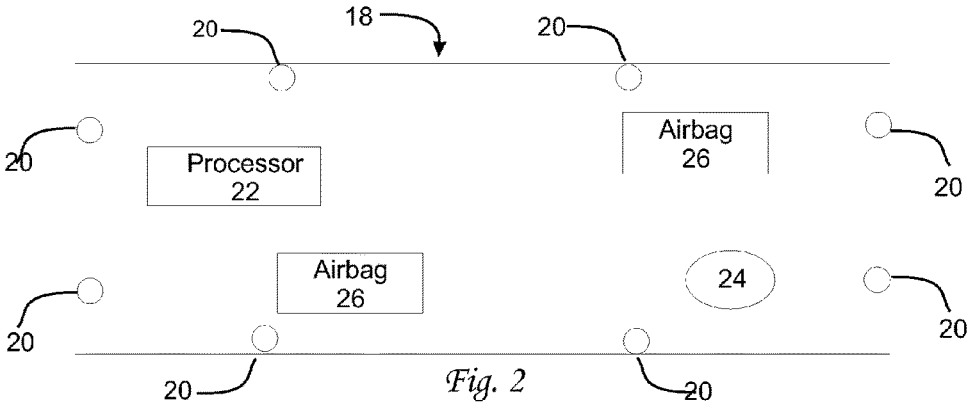
FIG. 2 is a schematic of a vehicle including a plurality of anticipatory sensors situated at various locations about the vehicle to enable information about objects approaching the vehicle in different directions to be obtained.

FIG. 2 shows a schematic of a vehicle 18 including a plurality of anticipatory sensors 20 situated at various locations about the vehicle to enable information about objects approaching the vehicle in different directions to be obtained. Each anticipatory sensor 20 could include an illuminator and an optical imager as described above. It is also possible that a single illuminator is associated with a plurality of optical imagers and/or that a single optical imager is associated with multiple illuminators.

An important part of the construction of preferred anticipatory sensors 20 of this invention is their ability to use range gating and spatial light monitors discussed above. Range gating permits the elimination of reflections up to and beyond the range of interest. This extends the distance that can be observed to well beyond that of the visual spectrum and the ability of the human eye, thereby permitting the anticipatory sensors 20 to see considerably further through fog, rain and snow etc. than the driver's vision. The system creates an image of a slice in space and, by eliminating everything in front of and beyond that slice, greatly simplifies the segmentation of the resulting image and greatly improves the ability to identify or classify any objects that are in the image being obtained by the optical imager portion of the anticipatory sensor 20. Thus, a processor associated with the anticipatory sensors 20 can be programmed to control the range gating function by controlling the spatial light monitors. This can be a common on-board processor 22 or a separate device to control all of the anticipatory sensors 20 or a separate processor for each anticipatory sensor 20.

A central processor 22 can be coupled to the anticipatory sensors 20 and can perform various functions enabling control and operation of the vehicle. For example, the central processor 22 can be coupled to the vehicle transmission, engine, accelerator, brakes, steering system and the like and enable the velocity vector of the vehicle 18 to be controlled based on the presence, relative velocity vector and location of other vehicles or objects, the presence of which was detected by the anticipatory sensors 20. Thus, the system provides a method for controlling the speed and direction of the vehicle 18 based on the distance between the vehicle and other objects. That is, the position and velocity of other vehicles of objects can be determined by the analysis of images obtained by the optical imager portion of the anticipatory sensors 20.

A vehicle should not be permitted to travel faster than would permit the vehicle to stop prior to hitting any object including an oncoming vehicle. This of course requires a calculation of the vehicle stopping distance which depends on the coefficient of friction between the tires and the road surface. On dry roads, this friction coefficient can vary between about 0.4 and 0.75 and therefore, a vehicle should include an onboard method of periodically measuring this coefficient, or otherwise being able to determine this coefficient. The anti-locking break system can be programmed to perform such measurements in very short time periods and without significantly affecting the motion of the vehicle and may even be unnoticeable to vehicle occupants.

Thus, various rules for limiting the speed of the vehicle as a function of the presence, position and velocities of other vehicles and objects, and the properties thereof, e.g., mass, type and size, and weather or road conditions and road tire friction coefficients can now be derived to prevent accidents by those skilled in the art.

The closing velocity between the vehicle 18 and another object can be determined by Doppler shifts or by the rate of range change as measured by the range gating function of the processor of the anticipatory sensor 20, by phase considerations, by modulating the pulse, or a combination of these methods or by any other appropriate method.

Once an image has been obtained by the optical imager portion of the anticipatory system 20, classification of any objects in the image can be achieved using pattern recognition techniques such as modular neural networks similar to those that are being used in the current assignee's optical occupant sensing system. In this system, about a 99.9% accuracy, as measured by real-world vehicle occupation, has been achieved. Similar accuracy for detecting and classifying objects that may impact the host vehicle as well as measuring their relative velocity vector prior to an accident is also achievable. Each image obtained by the optical imager portion of the anticipatory sensor 20 may be analyzed, with each image being obtained at a predetermined time spacing (for example every 20 to 100 milliseconds), or at an adjustable spacing which depends on, for example, the speed of the vehicle and the existence of one or more threats.

With respect to the time budget to enable an anticipatory sensor 20 to detect an object and assess the probability that the object is likely to impact the vehicle 18, assume a sensing time of about 100 ms, although 10 ms is feasible, and a deployment time of 100 ms, which is 3 times the deployment time of current frontal airbag systems, and the extreme case of an accident involving two vehicles approaching each other at a relative velocity of about 120 mph. This is the equivalent of a 60 mph barrier impact. Under these assumptions, simple calculations will show that the sensor 20 must start assessing the potential of an impact at a separation distance between the vehicle 18 and the approaching vehicle at about 35 feet and must initiate deployment of one or more airbags 26 at a separation distance of about 17.5 feet. This is likely the worst case scenario since a 60 mph head-on impact with a relative velocity of about 120 mph is probably not survivable with any system. This is additionally conservative since the proposed system has the capability of reliably sensing approaching objects at a separation distance of more than 35 feet assuming the absence of severe weather conditions.

The airbags in this situation would be triggered when the calculated probability of an accident is close to 100% to eliminate false positives. If the airbag system is not triggered, which might happen, for example, if the processor 22 cannot accurately estimate the mass of the impacting object or vehicle in a marginal crash, then one or more conventional crash sensors 24 can serve as a backup system in these marginal and especially low velocity cases to trigger the airbag(s) 26.

The foregoing discussion relates primarily to a preferred manner in which an event for which deployment of airbags from airbag systems is detected. What follows now is a discussion of a preferred type of airbags to be deployed when deployment signals are generated by the processor 22 based on data from the anticipatory crash sensor 20, and/or reactive crash sensors 24.

Introduction to Film Airbags

The airbags 26 are preferably made from thin plastic which can be made in a variety of practical designs. One preferred design is made from a combination of two plastic films. In one example, 1 mil Nylon® (polyamide) was laminated to 4 mils of polyurethane and used to make a side curtain airbag, i.e., an airbag which deploys along the left or right side of the vehicle and preferably substantially along the entire right or left side of the vehicle, and which also includes a plurality of interconnected compartments or chambers. This form of an airbag has considerably less mass than the present fabric and film airbags.

This is an initial example and no attempt has been made to optimize particularly the thickness and pattern of the polyurethane. There are two functions fulfilled by the polyurethane. First, when used in the seams, the polyurethane distributes stress concentrations into and along the seam. Second, the polyurethane stops the propagation of a tear in the Nylon® film, which is known as blunting.

In order to further increase the blunting effects and the tear resistance of the urethane in a composite Nylon® film and urethane airbag, it can be desirable to include reinforcing fibers, such as those of Nylon®, polyester, Kevlar®, boron, graphite, and/or glass, with the polyurethane. Such fibers may be included by randomly gluing them to the Nylon®. Also, nano-particles of these materials or other nano-particles such as from soot which serve as reinforcing material may also be included or incorporated into the polyurethane or the airbag.

The Nylon® can be biaxially oriented to significantly increase its tensile strength. This means that while being formed, the film is stretched in two axes to cause the film molecules to align along the directions of the film.

When this preferred design is used as a side curtain airbag, the failure mode of the chambers in the airbag under excessive pressure can take place within the chamber itself rather than in the seams which is the common failure mode for current fabric and film side curtain airbags. It is important to note that this use of the polyurethane in the seams will also work with fabric airbags except for those made with the so-called "one-piece woven" process wherein two sheets on fabric are interwoven at the seams. This will significantly reduce the stress concentrations and reduce the material thickness requirements. It is also important to note that a credible finite element analysis of the side curtain airbag is highly desirable in this process. In one case, for example, the current assignee analyzed a current high-volume production side curtain airbag and determined that with relatively minor changes to the shape of the chambers, the stress concentration, and thus the material thickness, can be reduced by a factor of two.

With further material optimization, it is expected that the film airbags will initially weigh less than half of the comparable fabric airbag and eventually about 25% based on initial calculations. It is noteworthy that the cost of a film airbags will be even less than the ratio of the weights since it is considerably less expensive to make and process film than fabric.

Thus, an important aspect of some embodiments of the present invention is the use of polyurethane or similar compounds, such as a rubbery elastomer, in the seams of an airbag, and particularly a film airbag, for the purpose of spreading stresses into and/or along the seams. Urethane or rubbery elastomers could be used in both film airbags and fabric airbags and also in hybrid airbags. By spreading the stress, stress concentrations are reduced and the airbag's strength is improved.

Various designs and aspects of airbags made from plastic film will now be described in more detail.

Figure 3:
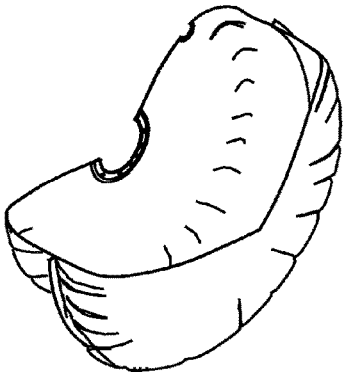
FIG. 3 is a view of an airbag made from a single layer of biaxially oriented plastic film.
Figure 4:
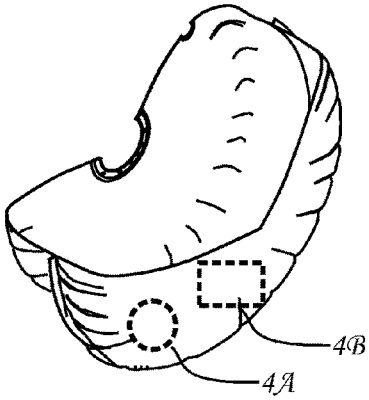
FIG. 4 is a view of an airbag made from a thick net with large spaces between the strands of the net with a thin film bridging the spaces.
Figure 4A:
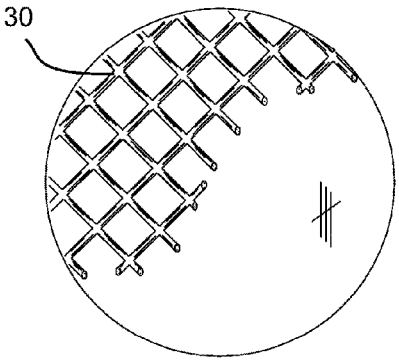
FIG. 4A is an enlarged view of a section of the airbag of FIG. 4 illustrating a net made of a monolithic film material.
Figure 4B:
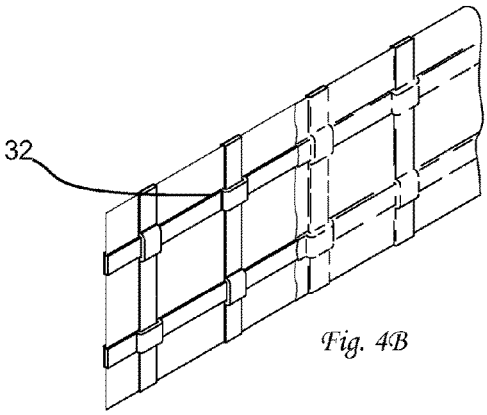
FIG. 4B is an enlarged view of a section of the airbag of FIG. 4 illustrating a net made from interwoven ribbons.

The structure of a film airbag is substantially influenced by the burst or tensile strength and tear strength requirements. If there are no tear requirements, for example, then a thin Nylon® film airbag can be designed for any burst strength requirements using biaxially oriented film as shown in FIG. 3. If, on the other hand, the only consideration is tear strength, then a thick stranded net with wide spaces between the strands and a very thin bridging film can be designed to withstand any reasonable tear forces as shown in FIG. 4 with representative sections shown in FIGS. 4A and 4B of alternative designs. FIG. 4A is an enlarged view of a section of the airbag of FIG. 4 taken at circle 4A illustrating a net 30 made of a monolithic material. FIG. 4B is an enlarged view of a section taken at rectangle 4B of the airbag of FIG. 4 illustrating an alternate design of a net made from interwoven ribbons 32. Neither design is in general satisfactory and therefore various alternative designs will be discussed below.

Figure 5:
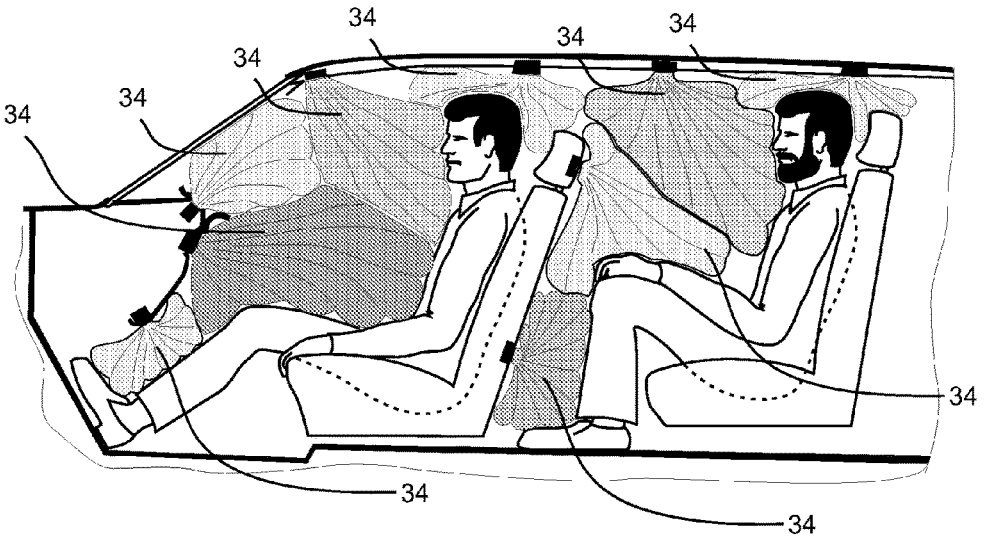
FIG. 5 is a view of a vehicle substantially filled with airbags.

Another issue that should be considered is whether an anticipatory sensing system is in use as shown in FIG. 2. If so, and if the safety system design involves filling the vehicle with plastic film airbags 34, as shown in FIG. 5, then the burst pressure requirement should be lower and the thickness of the plastic film reduced. This follows since the occupant will not strike the airbags at any significant velocity relative to the vehicle during the crash and, especially if there are several airbags supporting the occupant, the loads on these airbags should be reduced by at least half and perhaps more. Similarly, for the same reasons, the tendency for an airbag to tear should be substantially reduced.

Figure 6A:
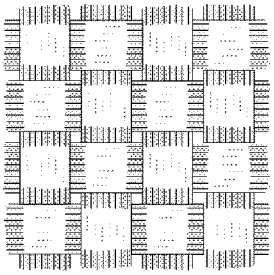
FIGS. 6A, 6B and 6C are views of a film airbag reinforced with closely spaced strands making up a woven net made with inexpensive fibers with strong fibers of a material such as carbon or Kevlar interspersed periodically.
Figure 6B:
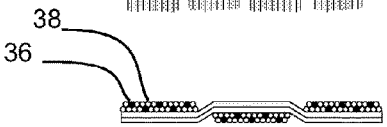
Figure 6C:
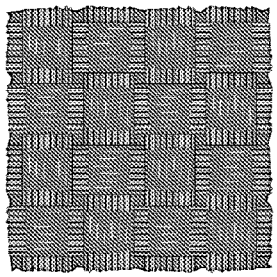

The design of a film airbag to meet a given tear resistance requirement is a tradeoff of thickness, weight and cost. To reduce the thickness of a film and net structure, for example, higher strength strands or fibers (for example carbon or Kevlar) 36 can be used at increased cost. This increase can be minimized by placing them periodically with less expensive fibers 38 in between as shown in FIG. 6B which is a side view of the film section of FIG. 6A. FIG. 6C illustrates the film section of FIG. 6A and FIG. 6B with a superimposed thin film laminated or otherwise joined to the fiber reinforcement. Similarly, by using larger spaces between the strands at the expense of thicker strands, the weight of the material can be reduced at the expense of thickness.

Figure 7:
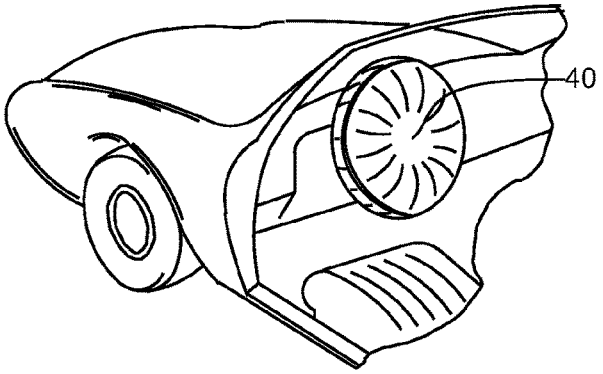
FIG. 7 is a view of a driver side steering wheel mounted airbag illustrating the location of the maximum stress.
Figure 8:
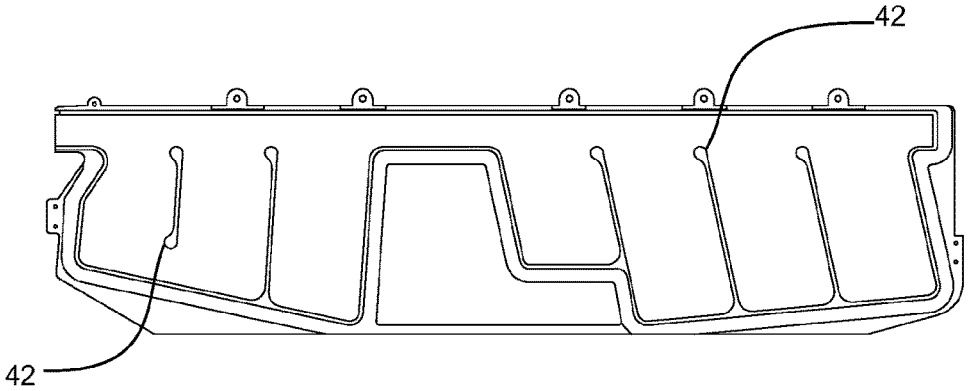
FIG. 8 is a view of a redesigned side curtain airbag illustrating the location of the maximum stresses in the seams of the airbag.
Figure 8A:
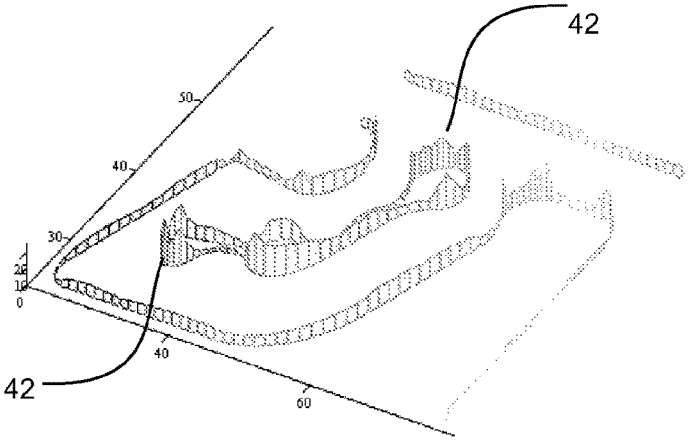
FIG. 8A is a plot of the peeling stress per unit of length at the adhesive joint in the left part of the airbag similar to the one shown in FIG. 8.

Usually a given type or design of airbag will have locations where the stress is greater than at other locations. For a film driver side steering wheel mounted airbag, for example, the maximum stresses are at the center 40 of the airbag away from the seams as shown in FIG. 7. On the other hand, for some side curtain airbag designs the maximum stresses occur at the seams in the islands between the various chambers as shown as 42 in FIG. 8 and in FIG. 8A, which illustrates a somewhat different design showing the results of a finite element analysis of a redesigned production side curtain bag. At least for the side curtain airbag, an accurate finite element analysis can determine the location of the maximum stresses and frequently a minor redesign of the seam shape can significantly reduce the magnitude of the maximum stress. In one case, for example, such an analysis on a high volume production side curtain airbag reduced the maximum stresses by about 50% resulting in a similar reduction in material thickness.

Another factor to take into account in designing an airbag is packaging and in particular how the airbag will be folded. If sharp creases are present, for example, the fibers used in a net might break during folding limiting the choice of materials. In some cases, the folding can be modified for a back and forth fold to a rolling of the film, in a similar manner as a Chinese whistle. However, in general, the choice of fold methods is dictated by airbag deployment considerations.

Airbag Made from Films

Figure 9:
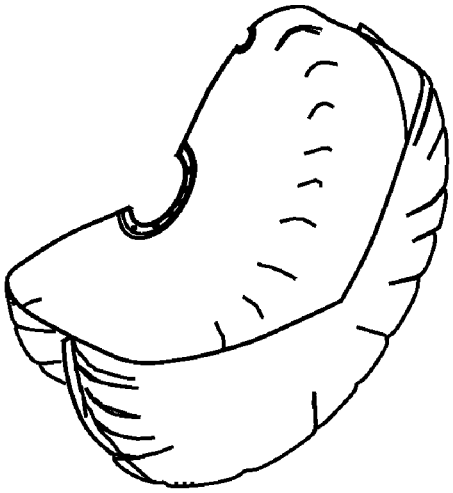
FIG. 9 is a prior art self shaping airbag from U.S. Pat. No. 5,653,464
Figure 10:
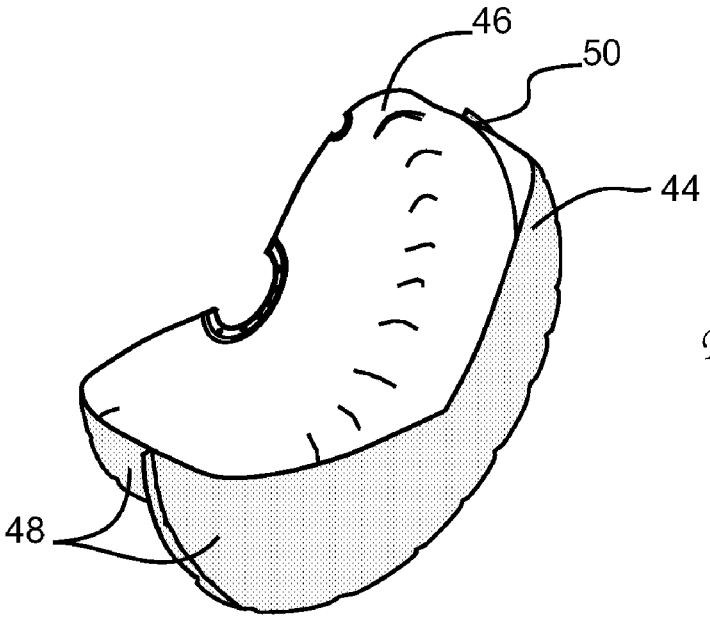
FIG. 10 is an airbag made from a film of Nylon® laminated to a film of polyurethane.

Let us first consider an airbag made from film only without reinforcement from fibers or a net. One advantage of an inelastic film airbag for some applications, such as the driver side steering wheel mounted airbag as disclosed in U.S. Pat. No. 5,653,464 and shown here as FIG. 9, is that the airbag automatically forms the desired shape without the use of tethers thereby substantially reducing the cost of making the airbag. Of course, airbags can be made of more elastic film to form a design continuum between the inelastic film case and the conventional fabric airbag which tends to form a spherical shape if not constrained by tethers. One design, shown in FIG. 10, that has substantial tear propagation resistance is made from a thin Nylon® film (0.001 to 0.004 inches) laminated to a somewhat thicker film made from polyurethane (0.004 to 0.008 inches). When such a bag is punctured, the urethane retards the spread of the tear through a process called blunting. When the bag is punctured with an ice pick, for example, at a location away from the areas of maximum stress, and the bag is pressured until failure, the hole caused by the puncture does not expand and the bag fails at one of the highest stress locations.

Usually the Nylon® film 44 is pre-stretched in two orthogonal directions to form a biaxially oriented film. This concept is partially disclosed in GB2316043 only in this reference, the urethane is on the outside and the Nylon® on the inside. For the embodiment shown in FIG. 10, the urethane 46 is on the inside so that it can also be used in the seams 50 and to facilitate heat sealing of two layers 48 together.

Figure 11:
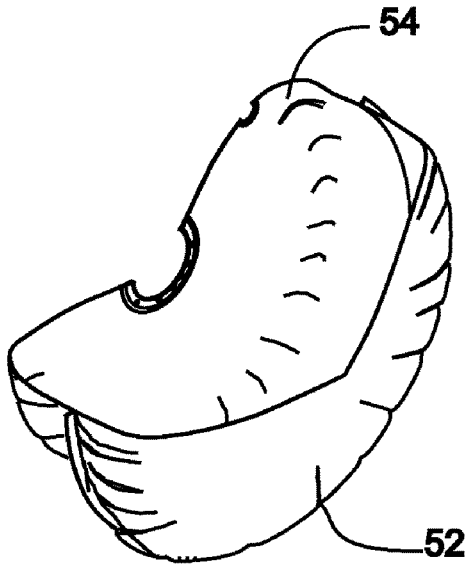
FIG. 11 is an airbag made from two weakly laminated uniaxially oriented Nylon® films with the orientation axes laminated orthogonally.

An alternate construction for the pure film airbag is to weakly laminate two or more films 52 and 54 of a strong material such as Nylon® together, each of which has been stretched in a single direction creating uniaxially oriented films. This is illustrated in FIG. 11. The manner in which two or more films may be weakly laminated together is known to those skilled in the art to which the invention pertains. See also, for example, U.S. Pat. Nos. 4,039,364 and 4,407,877. The films are laminated together with the orientation direction of one film placed at an angle, such as but not limited to 90 degrees, to the orientation direction of the other. When a puncture or tear occurs in the airbag, it will fork or tend to travel in different directions in the two films and thus its propagation in the composite airbag can be arrested. Of course, more than two films can be so joined and intermediate angles can be used which can increase the forking effect. One example is to use four such films with alternate films oriented in alternate directions 90 degrees from an adjacent film. Thus, the invention encompasses the formation of inflatable film airbags from cross-laminated uniaxial or uni-directional plastics or films.

Figure 12:
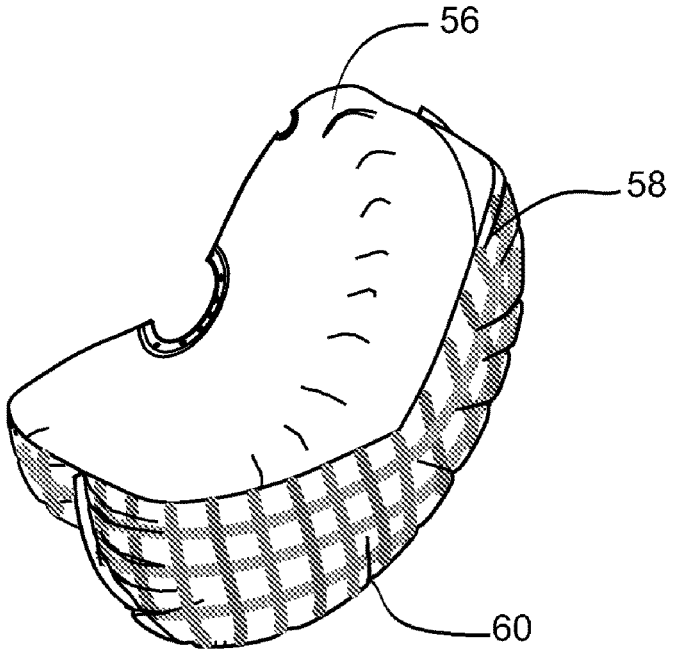
FIG. 12 is an airbag made from a net having 50% voids.

For example, consider taking two oriented films laminated at 90 degrees to each other. According to U.S. Pat. No. 3,322,613, the tear resistance would be doubled with some significant reduction in tensile strength since only one of the films will be strong in the machine or oriented direction of either film and the other can be assumed to contribute little. If one assumes the film that is oriented perpendicular to the tensile test direction has zero strength, then something less than twice the amount of material would be needed giving four times as much tear resistance for the initial tensile strength, assuming that a uniaxially oriented film is no stronger than a biaxially oriented film. As illustrated in FIG. 12, a net 58 with 50% voids 60 filled with a thin bridging film 56 can provide the same tear resistance and tensile strength at half of the material weight as the double thickness bag and to the extent that a uniaxially oriented material is stronger than a biaxially oriented material, the material can be made thinner.

Airbag Made from Net Reinforced Film

Figure 13:
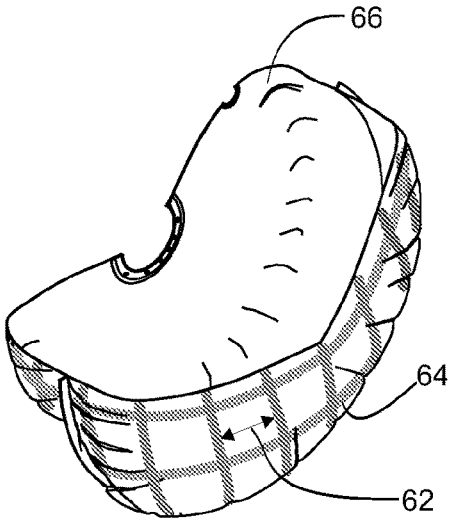
FIG. 13 is an airbag made from a net having 95% voids.

The original concept of using a net and film combination for airbags is believed to have been first disclosed in U.S. Pat. No. 5,505,485, where calculations were provided to show that a substantial reduction in the weight of an airbag can be obtained through such a construction. The argument presented was that airbags are designed to resist a given tear force which was largely determined by the strength of a single yarn. During tearing, it was argued, the piece of yarn at the apex of a propagating tear carried nearly all of the load or the tear producing force. Naturally, if the yarns are loosely woven and permitted to move relative to each other, then some of the load will be shared by adjacent yarns. For tightly woven airbags and for those containing a superimposed film, this relative movement is minimal and thus the force resisted by a single yarn will be close to the tearing force. Therefore, if the yarns are made thicker thereby increasing their tear resistance, they can be spaced further apart bridged by a thin film that is sufficient to resist the pressure within the airbag as illustrated in FIG. 13. If this spacing 62 is equivalent to 40 diameters of the original yarn and if the new yarn 64 is, for example, twice as thick, then the weight of the fabric can be reduced by an order of magnitude and the weight of the resulting airbag, assuming the film is made sufficiently strong to resist the bursting force, can be reduced by at least a factor of two.

One design that makes use of the above concept is an airbag made from a net with one or two thin layers of polyurethane 66, or a similar elastomer, laminated to the net. The polyurethane or similar elastomer has the advantage over Nylon® in that it will be less likely to tear due to its forgiving elastic nature or blunting. To obtain comparable strength to resist the airbag pressure, on the other hand, the elastomer will need to be somewhat thicker than a film made from a stronger and more inelastic polymer such as Nylon®. If Nylon® is used for the film 66, then it can be a non-oriented Nylon® providing some stretching capability and thus some tear resistance. Due to its greater strength, a Nylon® film laminated to a Nylon® net would form a particularly thin airbag for its strength and possess both superior tear resistance and burst pressure properties. For this Nylon® film case, urethane may still be used in the seams as discussed below.

Figure 14:
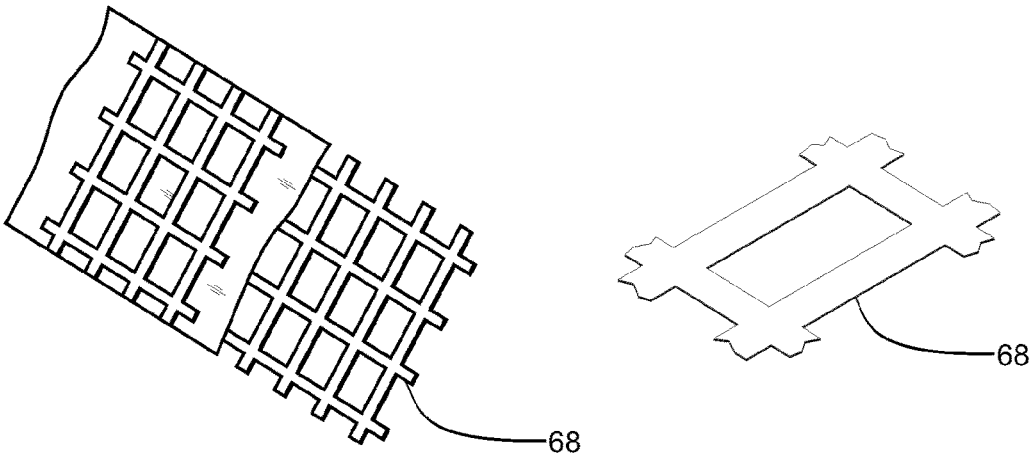
FIG. 14 shows two views of a section of an airbag illustrating a net made from film.
Figure 15:
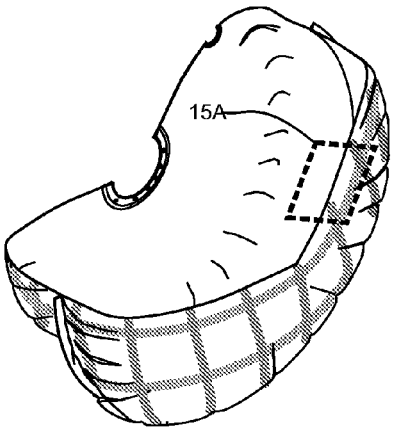
FIG. 15 is an airbag illustrating a net woven from spun yarn and FIG. 15A a view of a piece of the airbag of FIG. 15.
Figure 15A:
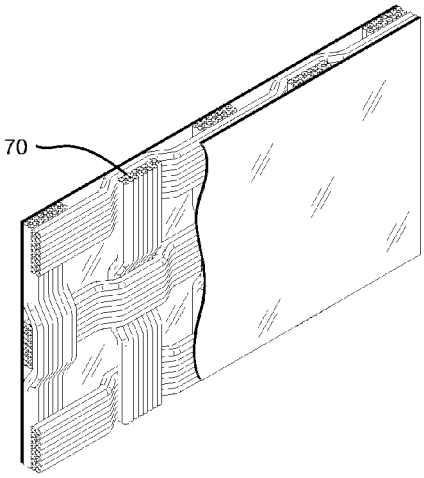
Figure 16:
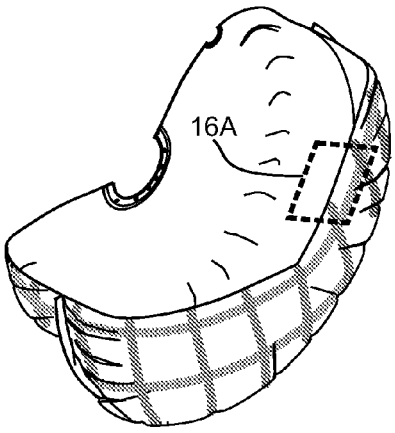
FIG. 16 is an airbag illustrating a net woven from monolithic yarn and FIG. 16A a view of a piece of the airbag if FIG. 16.
Figure 16A:
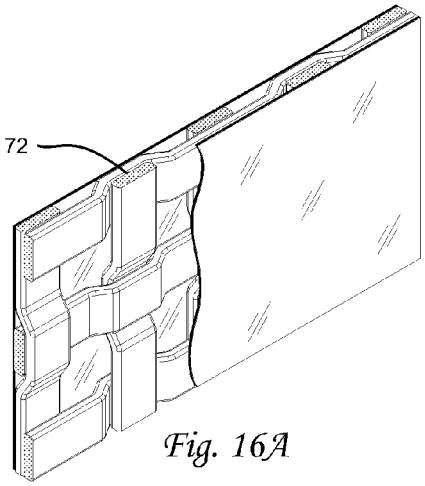

The net can be constructed from a monolithic film as shown as 68 in FIG. 14 or it can be woven from yarn 70, as illustrated in FIGS. 15 and 15A or from strands of solid polymer material 72, as shown in FIGS. 16 and 16A. The spacing of the net can vary and as shown in FIGS. 15 and 16 and in more realistic representation in FIGS. 15A and 16A. Making a net structure from film is discussed in U.S. Pat. Nos. 3,322,613 and 3,864,198, among others. If the net is woven, then its maximum thickness will be twice that of a net made from a monolithic film, i.e. a film-net, due to the crossover thickness where the warp yarn crosses the weft yarn. Also, a net made from film does not need to be round and thus the thickness of the airbag can be further reduced. The extreme case of this concept is found in common tarps that are made from tightly woven ribbons of film and will be discussed below. The net material can be biaxially or uniaxially oriented to increase its strength. If uniaxially oriented, then two layers of the net material can be used and laminated so that their orientation directions are at an angle, such as about 90 degrees. Also the materials can be designed to yield somewhat to permit adjustment of the stress so that the full width of the net strand is available to counteract the tear stress. If the net is woven loosely, then some motion of the strands relative to each other can permit several strands to contribute to resisting a propagating tear which would further permit a reduction in net thickness.

Figure 17:
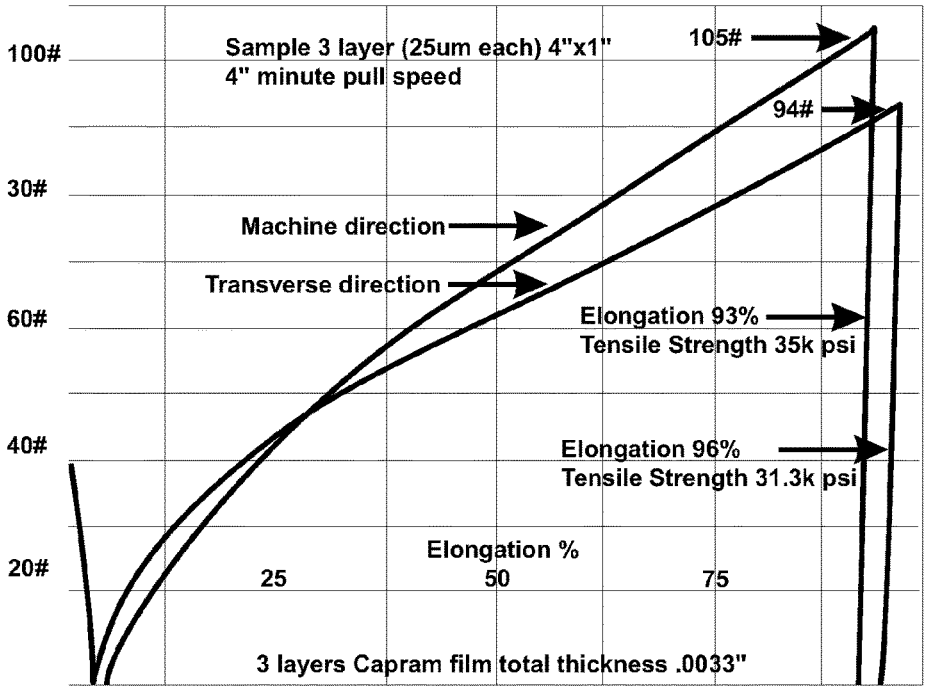
FIG. 17 is a typical stress strain curve from a three layer Nylon® film.
Figure 18:
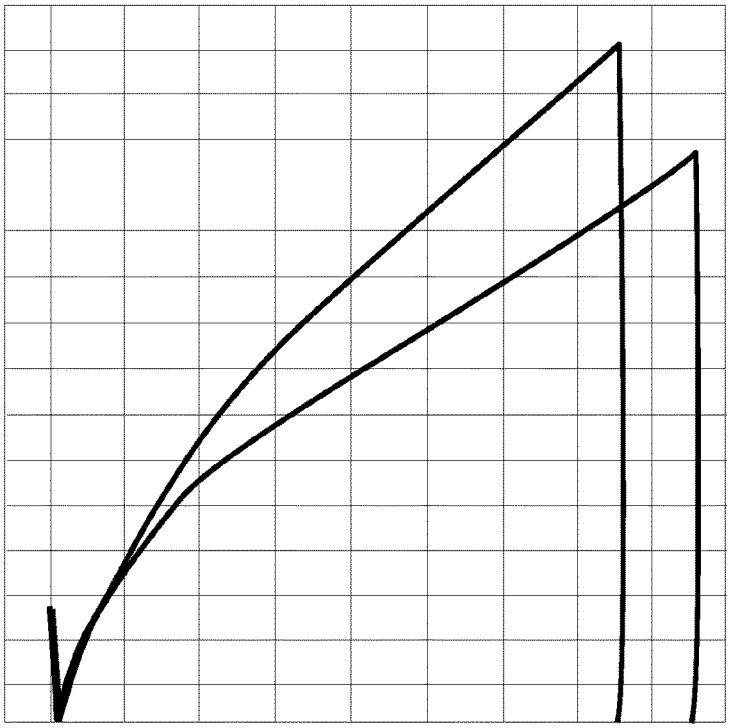
FIG. 18 is a typical stress strain curve from a four layer Nylon® film.

FIG. 17 illustrates Instron test results of a sample of a three layer laminated biaxially oriented Nylon® film showing the substantial elongation that occurs with this film. In some cases, it is not desirable to allow for this much elongation to failure indicating that the amount of orientation or pre-stretching should be increased. By allowing nearly 100% elongation to failure, an airbag could deform substantially like a balloon which could partially defeat the safety features of the airbag. Also, as the material stretches, it also becomes thinner. Thus, if the material is pre-stretched to close to its breaking point, it will result in the usage of thinner and thus a smaller amount of material. Commercially available uniaxially and biaxially oriented Nylon® exhibits this elongation property indicating that to optimize the material for a film airbag, increased orientation in addition to commercial standards is suggested which will further reduce the amount of material used and thus the cost and weight of the airbag. FIG. 18 shows the effect of a four layer film. The scales of FIGS. 17 and 18 are substantially the same indicating that the fourth layer contributes more than 33% to the strength.

Figure 19:
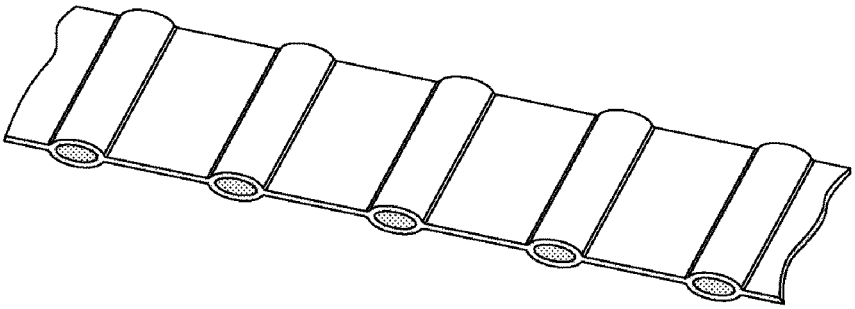
FIG. 19 is a piece of an airbag made from a material where the film and the net are made in a single process.

Another geometry to be considered is to make the net and film together in a single process as disclosed in U.S. Pat. Nos. 3,713,942 and 4,076,121 and illustrated in FIG. 19.

Airbag Made from Ribbon Reinforced Film

Figure 20A:
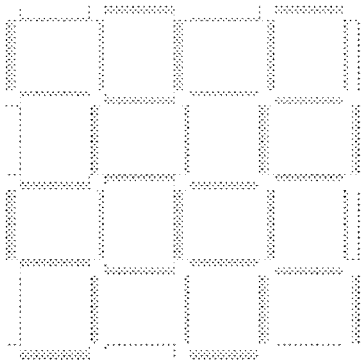
FIGS. 20A, 20B, and 20C illustrate a piece of an airbag made from woven film ribbons with films weakly laminated on each side.
Figure 20B:
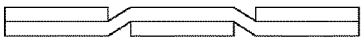
Figure 20C:
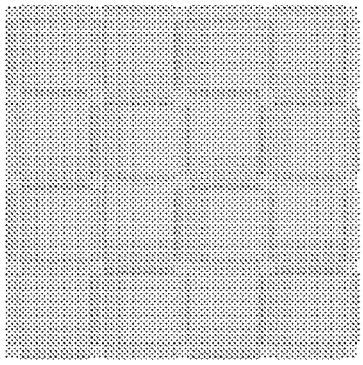

As mentioned above, an airbag can be constructed in a manner similar to common tarps where tightly woven ribbons made from film are laminated with a layer of film on each side as illustrated in FIG. 20. The ribbons are commonly made from polypropylene or polyethylene and the films from polyethylene. Other materials such as Nylon® or polyester for the ribbons and Nylon®, polyester or polyurethane for the films can be used as taught herein. Thus, one or more layers of film can be laminated on the inner side of the woven ribbons and one or more layers of film can be laminated on the outer side of the woven ribbons. Different layers of film may be used on the inner and outer sides of the woven ribbons. The tight weaving of the ribbons may be designed to ensure that apertures less than a threshold are provided between the warps and wefts, or no apertures at all.

Generally, in the weaving process, one set of ribbons oriented in one direction are woven with another set of ribbons oriented in a perpendicular direction. Other ways to attach ribbons oriented in different directions to one another are also envisioned as are other weaving patterns for the ribbons.

One tarp that is available commercially from Home Depot has a thickness of about 0.005 inches with the ribbons having a thickness of about 0.002 inches and the film having a thickness of about 0.0005 inch laminated on each side of the ribbons. A pull test of this tarp at a 45 degree angle to the warp and weft demonstrated that the bond between the film and the ribbons was weak permitting the ribbons to move and to adjust to the stress allowing sharing of the stress among several ribbons as an aid to resisting a propagating tear.

FIG. 21 illustrates the deformation of a piece of bag material made from interwoven ribbons 74 where the film is beginning to fail as the ribbons stretch.

Figure 22:
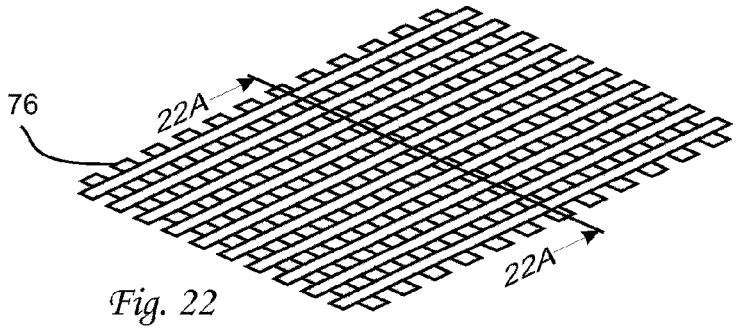
FIG. 22 is a piece of an airbag made with unwoven film ribbons which are weakly bonded together and to films on each side.
Figure 22A:
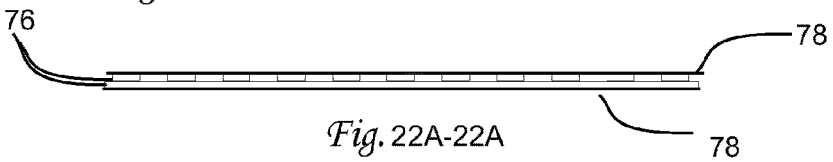

When used for airbags, it is desirable for the ribbons to stretch a bit before failing in order to permit some adjustment and sharing of the stress in high stress areas such as near the seams and during the propagation of a tear. Although tarps use woven ribbons, it is also possible to layer the ribbons on top of each other without weaving them together. In this case, the layers of ribbons can be placed at about 90 degrees to each other and they can be weakly bonded together and to the films in order to hold the assembly together as illustrated in FIG. 22 where the ribbons 76 are shown with the films 78. Delamination, which is a concern in tarps that may flap in the wind, is less of a concern for airbags. This permits a weak bonding material to be used to join the various layers together. Again, the ribbon layers can be uniaxially oriented to increase their tensile strength.

The films 78 can be made from urethane, or other elastomer, Nylon® (polyamide), polyester or other suitable material and the ribbons from a strong film such as Nylon® or polyester.

One advantage of this structure as compared with a net reinforced film is that the resulting airbag is uniformly thick. The choice among these various structures heavily depends on the tear and tensile requirements for the material. If, as is thought to be case for several airbags, the tensile or burst strength requirement is dominant, then only minimal tear resistance is dictated. In this design, the tear resistance is controlled by the ribbons and the burst strength is controlled by a combination of the ribbons and the film. The film, however, assuming that it is a high strength film such as Nylon® or polyester, provides burst strength resistance in all directions whereas the ribbons only contribute in the ribbon direction. Thus, it requires twice the thickness of ribbons than that of film to achieve the same burst strength, assuming that the same material is used for both the ribbons and the film. One compromise solution, for example, is to make the ribbons and the film the same thickness. Thus, if the ribbons are about 0.002 inches thick then the composite bag would be about 0.008 inches thick. This is a good place to start an airbag design and then optimization based on tests can vary the ratio.

Airbag Made from Fiber Reinforced Film

High performance sails for sailboats are sometimes made using Mylar film and fiber reinforcement made from Kevlar or carbon. U.S. Pat. No. 5,333,568 to Meldner, for example, describes a sail cloth made from very thin carbon fibers made first into tapes and then laid side by side in two layers which are placed at an angle such as 90 degrees with respect to each other. The fiber layers are then bonded to each other and to covering films resulting in a very strong material which is very light, thin and tear resistant. Although the '568 patents suggests that the material could be used for airbags, the cost of such a material would be prohibitive for airbags but nevertheless it serves as an extreme case for comparison purposes. One feature of the material that is claimed is that it suffers no crimp, meaning that the sail, once made, retains its shape and does not stretch under high loads. This is a very important property for sails as their airfoil shape is critical for high performance racing. It is not a particularly important property for airbags which can tolerate some deformation when they deploy and in fact, as described below, some yielding can aid the tear resistance of the material and help to relieve some high stress areas such as in the seams.

Figure 23:
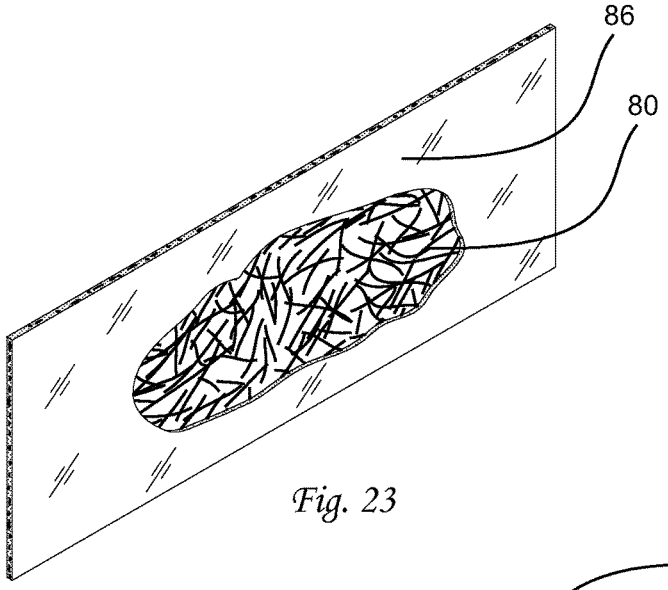
FIG. 23 is a piece of an airbag made from a film with embedded randomly oriented fibers.
Figure 24:
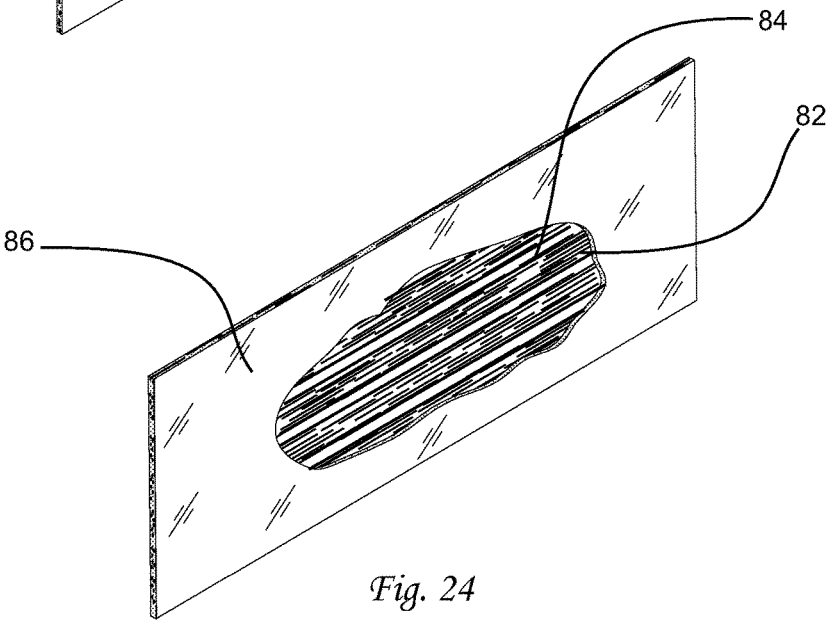
FIG. 24 is a piece of an airbag made from oriented fibers made into tapes.

For some applications however, airbags can be made from either an oriented or random placement of fibers into a film as illustrated in FIG. 23. U.S. Pat. No. 3,003,304 describes a sheet of loosely bonded oriented fibers laminated with other similar sheets at angles. In one preferred case, the film 86 is an elastic film such as urethane and the fibers are randomly distributed in the film. In another case, the film 86 is Nylon® and the fibers 82 are oriented in the form of tapes 84 that are bonded to the film in a manner such as a net as shown in FIG. 24. In both cases, the fibers can by made from a variety of materials as monofilament material or multifiber yarns made of, for example, carbon fiber, aramid fiber (Kevlar®), polyester fiber or fiber sold under the trademarks PBO®, Pentex® or Spectra® as described in U.S. Pat. No. 6,112,689.

The first way sail makers attempted to control sail stretch is by using low-stretch high modulus yarns in the making of the sailcloth. The specific tensile modulus in gr/denier is about 30 for cotton yarns (used in the 1940's), about 100 for Dacron® polyester yarns from DuPont (used in the 1950's to 1970's), about 900 for Kevlar® para-aramid yarns from DuPont (used in 1980's) and about 3000 for carbon yarns (used in 1990's) as discussed in U.S. Pat. No. 6,265,047. For comparison purposes and assuming a material with a specific gravity of 1.0, the thickness of a 10 denier yarn is about 0.0013 inches, of a 100 denier yarn is about 0.004 inches and for a 1000 denier yarn is about 0.0126 inches.

A film made from an elastic polymer with random embedded fibers can be a very cost effective airbag material but for a given burst strength and tear resistance, it will be somewhat thicker and heavier than the film plus net approach described above. Another approach as disclosed in U.S. Pat. No. 4,084,028 is to use two angled oriented films plus axial fibers in an elastic adhesive layer. The fibers can be made from slit films and can be flat and should have some stretching ability and should not adhere strongly to the adhesive.

Secondary Considerations

Figure 25:
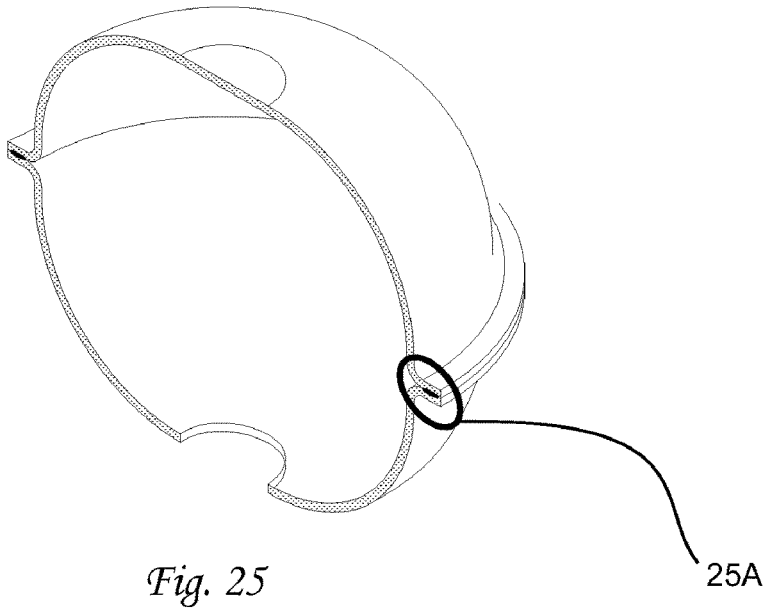
FIG. 25 is a view of the use of polyurethane in the seams of an airbag to aid in the redistribution of stresses.
Figure 25A:
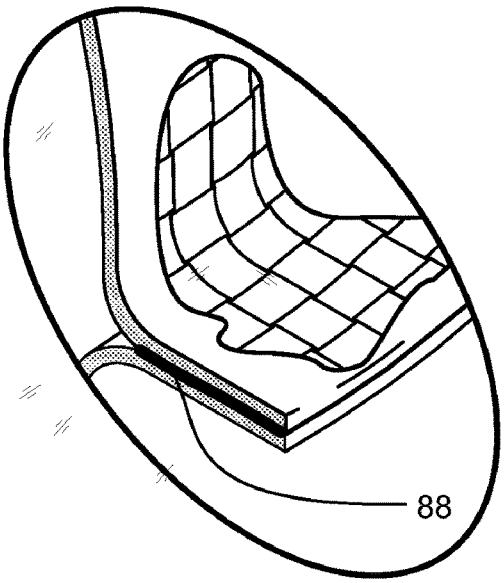

As discussed above, for some airbags, such as the side curtain, the maximum stress generally occurs in the seams whereas for the driver steering wheel mounted airbag it generally occurs at the poles, that is, in the center of the airbag in line with the steering wheel axis. For the curtain airbag, the thickness of the material is dictated by the stress at these maximum stress locations. If the airbag has a uniform thickness, then this thickness has to be sufficient to withstand the stress in the seams. This situation is improved if the stress at the maximum stress location can be distributed along the seam and even into the seam, both of which can occur if the two pieces of material are joined together with an elastomer such as polyurethane that can stretch somewhat. This elastomer can be used as the bonding agent for joining the pieces of material together through heat sealing, for example. If polyurethane is already a film material being used in the airbag, then nothing additional is required other then to heat seal the two films together. If polyurethane is not part of the material being used for the airbag, then strips of polyurethane, or other suitable thermoplastic elastomer, 88 can be placed in the seam areas for bonding the film materials together and providing the stress redistribution function as shown in a driver side airbag example in FIG. 25.

A good finite element analysis of the airbag is of course the first step in controlling the concentration of stresses in the airbag design before resorting to the stress redistribution method discussed above. A detailed analysis of one curtain airbag is provided in U.S. Pat. No. 7,040,653 and in particular in Appendix 1 thereof and in the references cited in Appendix 1 all of which are included herein by reference.

Figure 26:
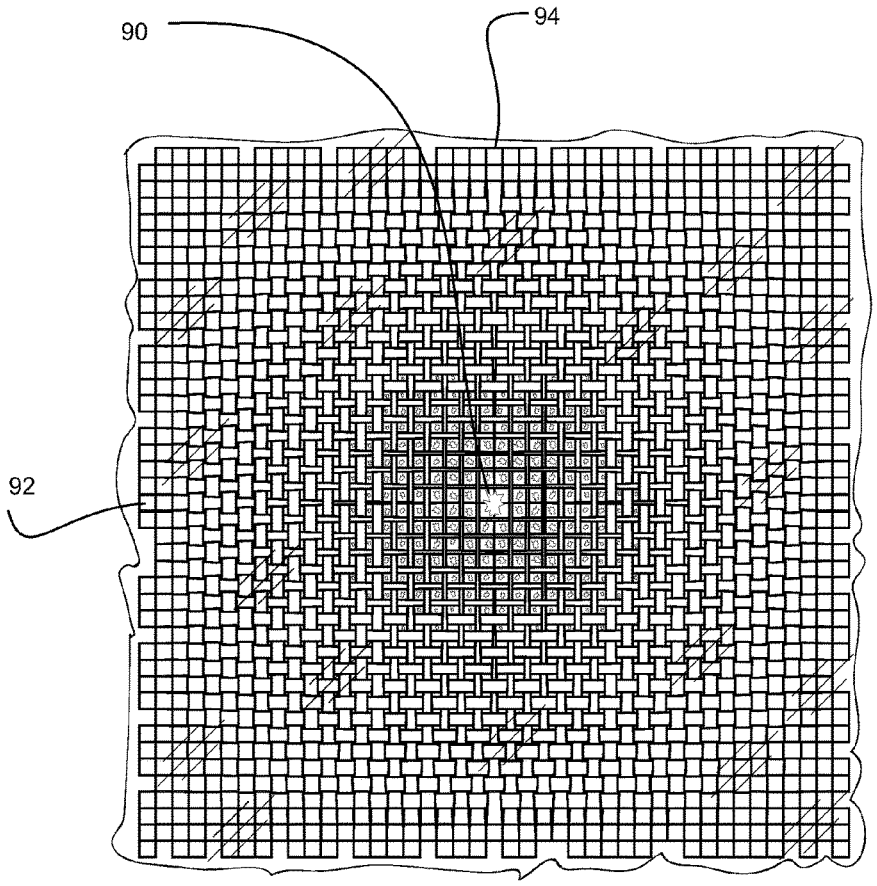
FIG. 26 illustrates an airbag made from ribbons in the process of being torn caused by a puncture and illustrates the yielding and thus the redistribution of the tear stress across the ribbons.

If the airbag is made from ribbons of film then, as mentioned above, a certain amount of yielding of the ribbons before breaking is also desirable as a method of distributing the stress across the ribbon when the material is being subjected to tearing. This is illustrated in FIG. 26 which shows a piece of airbag material that has been punctured at 90 breaking ribbons 92 and 94 and causing adjacent ribbons to stretch and distribute the load.

Figure 27A:
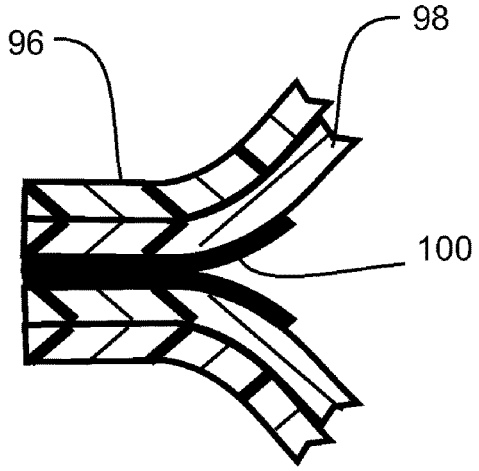
FIGS. 27A and B illustrates the before and after redistribution of stresses by the urethane in a seam.
Figure 27B:
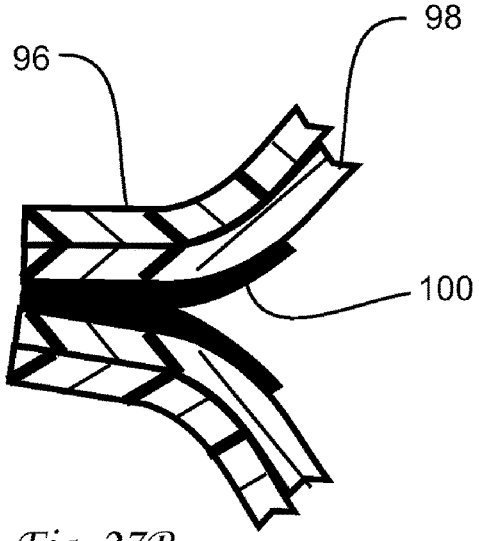

Similarly, if the selected airbag structure involves a somewhat rigid or inelastic film either in the form of a film layer or of a layer of film ribbons a certain amount of yielding can also serve to redistribute stresses in the stress concentration areas in the seams as shown in FIGS. 27A and 27B where a Nylon® film is illustrated at 98 with a superimposed net at 96 and an elastomeric film in the joint at 100. Although it would not be desirable for the bulk of the airbag to plastically deform, in these two cases of a propagating tear and to relieve stress concentrations at highly stressed locations, it is beneficial.

If the stress concentrations are still troublesome and cannot be relieved through bag geometry redesign, then in some cases, a reinforcement can be laminated at the high stress points in much the same manner as such reinforcement is frequently used in making sails. The goal of airbag designer should be to create a structure that has as close as possible a uniform stress throughout the airbag. In some extreme cases, the airbag can be designed to fail in a particular manner through the use of rupture zones that fail such that as the bag is being loaded the failure does not compromise the performance of the airbag. This concept applied to plastic bags is disclosed in U.S. Pat. No. 5,205,650.

A pure plastic film bag may have an objectionable feel or effect when it contacts human skin. A solution to this problem is disclosed in U.S. Pat. No. 3,746,608 for treating the surface of the film to give it a softer fabric like feel.

Examples of Film Airbags

Figure 28:
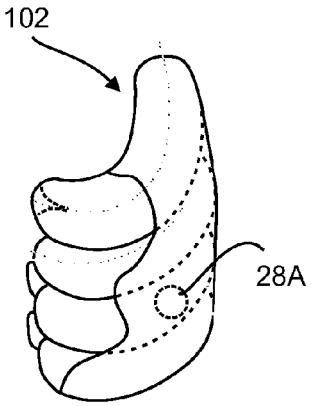
FIG. 28 is a knee bolster airbag made from ribbons with an enlarged view of a portion of the airbag taken at circle 28A shown in FIG. 28A.
Figure 28A:
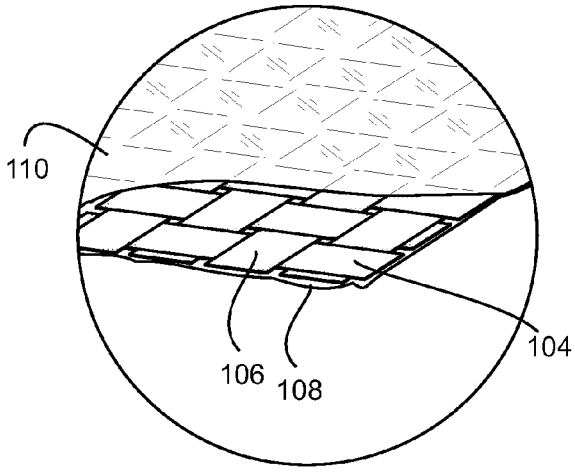

A knee protection airbag constructed according to teachings of one implementation of this invention is illustrated generally at 102 in FIG. 28. A part of the airbag has been expanded to illustrate the construction comprising interwoven ribbons 104 and 106 and overlaying films 108 and 110. For this construction, Nylon® or polyester can be used for both the ribbons and the overlaying films. Since Nylon®, for example, does not readily adhere to itself, layers of adhesive, not shown, are used between the ribbons and the films as is well known in the art. The seams, not shown, that join the various pieces of material together can contain a thermoplastic elastomer to aid in the joining process and to provide some relief of the stress concentrations that typically occur in the seams. Vent holes, not shown, are also provided to aid in absorbing the impact energy of the occupant's knees during impact through controlling the outflow of gas from the airbag.

An alternate construction is to use a different polymer such as polyethylene or polyurethane for the internal film layer which then can be used to join the various pieces of material together through heat sealing. For this application, the film layers and the ribbons can be from about 0.001 to about 0.003 inches thick depending on the design requirements.

Figure 29:
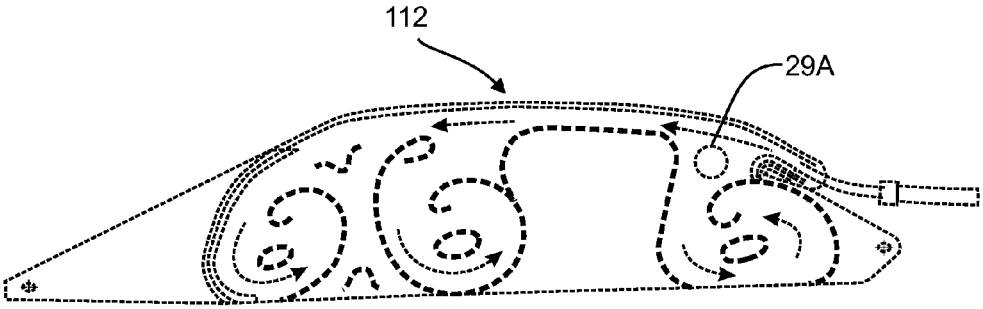
FIG. 29 is a side curtain airbag made from ribbons with an enlarged view of a portion of the airbag taken at circle 29A shown in FIG. 29A.
Figure 29A:
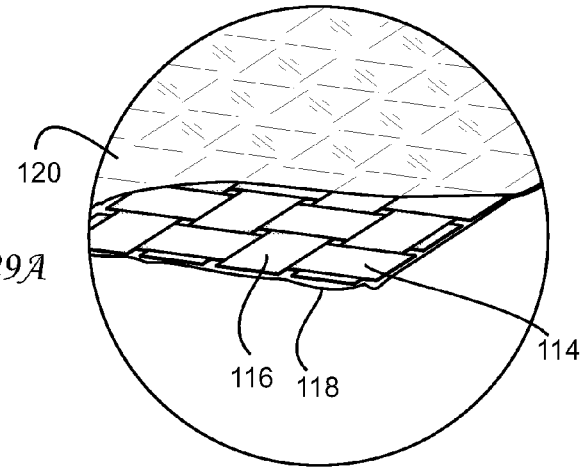

A side curtain airbag constructed according to the teachings of one implementation of this invention is illustrated generally at 112 in FIG. 29. A part of the airbag has been expanded to illustrate the construction comprising interwoven ribbons 114 and 116 and overlaying films 118 and 120 in the same manner as illustrated for the knee protection airbag of FIG. 28. Similarly, for this construction Nylon® or polyester can be used for both the ribbons and the overlaying films with layers of adhesive, not shown, are used as is well known in the art. The seams, not shown, that join the various pieces of material together can contain a thermoplastic elastomer to aid in the joining process and to provide some relief of the stress concentrations that typically occur in the seams. Vent holes are generally not provided due to the requirement that the side curtain airbag remain inflated for several seconds.

An alternate construction is to use a different polymer such as polyethylene or polyurethane for the internal film layer which then can be used to join the various pieces of material together through heat sealing. For this application, the film layers and the ribbons can also be from about 0.001 to about 0.003 inches thick depending on the design requirements.

Aspirated Inflators

Referring again to FIG. 2, in a preferred embodiment, the airbags 26 are arranged to fill substantially the entire interior compartment of the vehicle 18 in which the occupant or occupants to be protected by the deploying airbags are situated. However, if the passenger compartment of the vehicle 18 is to be filled with deploying airbags 26, the air to fill the airbags 26 should be predominately cabin air (i.e., air from the passenger compartment itself prior to the event for which the airbags 26 are being deployed) in order to prevent ear damage and resulting hearing loss, broken windows and forced door openings. Today, about 17% of people exposed to airbag deployments suffer some permanent hearing loss. This can be mitigated with the use of aspirated inflators.

Early in the airbag history many attempts were made to develop aspirated inflators. Generally these attempts failed and some resulting products on the market had mixing ratios as low as 1.05. In other words, only about 5% of the air filling the airbag came from the passenger compartment.

One reason for this is the fact that previous inflator designers did not understand the importance of the ratio of jet diameter to the mixing length. The mixing length is the flow length after the convergence of the aspirated air and the propellant flows required to efficiently mix the incoming air with the inflator gas. If sufficient mixing length is not present, then the aspiration ratio degrades. As a result of the jet diameter selected by the early aspirated inflator designers, the required mixing lengths were long and unobtainable within the volume allocated for the airbag module. In an aspirated inflator in accordance with the invention, the inflator jets are a few thousandths of an inch thick resulting in a mixing length of approximately 1 inch, which is easily obtainable. As a result, experimental models of the aspirated inflator have obtained pumping ratios of six to one or more. A pumping ratio of at least three to one is considered acceptable for this application. A three to one pumping ratio means that three parts of cabin air are used for each one part of inflator gas thus giving an about 75% reduction of inflator propellant. A desirable secondary benefit is the reduction of propellant results in a "greener" inflator.

The second problem relating to aspirated inflators is that the size of the opening through which the cabin air flows must be large. As soon as the pressure drop across this opening exceeds about two to one, choked flow occurs meaning that regardless of the pressure ratio, further air cannot be brought in from the passenger compartment. This is related to the speed of sound. In the present design, the requirements for the size of this opening are more easily met since the inflation time has been increased by a factor of about 3. Since there is a longer inflation period, a smaller opening can be used. However, for the backup case where the system cannot accurately measure, for example, the mass of the impacting object, a traditional system can be activated to inflate the driver and passenger airbags. This choked flow phenomena requires either a three times larger opening area or that additional propellant be available for inflating the driver and passenger airbags in time. However, this may not be the case since it is primarily in marginal crashes where conventional crash sensors will be used to initiate deployment and there is typically more time available to deploy the airbag in such cases. Note that this generally will only be relevant where the significance of the mass of the impacting objects determines whether the airbags should be inflated or not. For these cases, a slower inflation can also be tolerated.

There are two additional advantages in using aspirated inflators. The first is that airbags filled by aspirated inflators are inherently self-limiting. As the pressure in the airbag increases, the aspiration ratio decreases and thus the airbag, when it impacts an occupant, will conform to the occupant and as the pressure in the airbag increases, additional flow will be restricted. The second advantage is that aspiration permits the use of propellants that burn more slowly and create more carbon dioxide or other undesirable gases since much less propellant is being consumed.

In view of the foregoing, a preferred embodiment of an airbag system in accordance with the invention would include a plurality of film airbags which, when deployed, substantially fill the entire interior compartment of a vehicle, and aspirated inflators for inflating these airbags. When combined with a sensor system which relies primarily on highly accurate anticipatory sensors 20 as described above (to the extent such sensors provided accurate data and if not, secondary reliance on conventional crash sensors), a comprehensive vehicular safety system is obtained which should be effective to reduce and possibly even substantially eliminate injuries and fatalities arising from vehicular accidents.

It should also be understood that for any of the airbags formed as described above, the port or ports through which inflating fluid is to be directed into the space defined by the airbag, and vented from the airbag, may be formed using any technique known to those skilled in the art. The connection of the airbag to an airbag module or housing, and the folding or other placement of the compacted airbag into an airbag housing or module may be achieved using any known technique.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

[1. An inflatable airbag for a vehicle which is deployed in the event of an accident involving the vehicle to provide protection for an occupant of the vehicle, comprising:

a plurality of ribbons coupled together to define an enclosed, fluid-retaining space; and a layer of film laminated on at least one of an outer side of the woven ribbons and an inner side of the ribbons.]

[2. The airbag of claim 1, wherein the ribbons are made from polypropylene, polyethylene, polyester or polyamide and the layers of film are made from polyethylene, polyurethane, polyester or polyamide.]

[3. The airbag of claim 1, wherein said plurality of ribbons comprises a first set of ribbons oriented in a first direction and a second set of ribbons oriented in a second direction different than the first direction, said first and second sets of ribbons being attached together.]

[4. The airbag of claim 3, wherein said first and second sets of ribbons are woven together.]

[5. The airbag of claim 1, wherein said ribbons are formed in separate pieces, further comprising an elastomer arranged at seams at which said pieces are coupled together to form the space.]

[6. The method of claim 5, wherein the elastomer is polyurethane.]

[7. The method of claim 6, wherein the elastomer is part of the pieces of airbag material.]

[8. The airbag of claim 1, wherein said ribbons are coupled together to define a side curtain airbag.]

[9. The airbag of claim 1, wherein said ribbons are coupled together to define a knee airbag.]

[10. The airbag of claim 1, wherein said ribbons and said layers of film are made of different materials.]

[11. The airbag of claim 1, wherein a layer of film is laminated on both the outer side and the inner side of the ribbons.]

[12. A method for forming an inflatable airbag for a vehicle which is deployed in the event of an accident involving the vehicle to provide protection for an occupant of the vehicle, comprising:

coupling a plurality of ribbons together to define an enclosed, fluid-retaining space; and laminating a layer of film on at least one of an outer side of the woven ribbons and an inner side of the ribbons.]

[13. The method of claim 12, wherein the plurality of ribbons comprises a first set of ribbons oriented in a first direction and a second set of ribbons oriented in a second direction different than the first direction, the step of coupling the ribbons together comprising weaving the first and second sets of ribbons together.]

[14. The method of claim 12, wherein the ribbons are formed in separate pieces, further comprising arranging an elastomer at seams at which the pieces are coupled together to form the space.]

[15. The method of claim 12, wherein a layer of film is laminated on both the outer side and the inner side of the woven ribbons.]

[16. A method for forming an inflatable airbag for a vehicle which is deployed in the event of an accident involving the vehicle to provide protection for an occupant of the vehicle, comprising:

providing a plurality of pieces of airbag material, the pieces having substantially the same thickness and composition; and joining the pieces together at seams using an elastomer such that the elastomer constitutes a bonding agent for joining the pieces of material together and stress at the seams is distributed along the seams and possibly into the seams.]

[17. The method of claim 16, wherein the elastomer is polyurethane.]

[18. The method of claim 16, wherein the elastomer is part of the pieces of airbag material.]

19. A method for forming an inflatable film airbag for a vehicle which is deployed in the event of an accident involving the vehicle to provide protection for an occupant of the vehicle, comprising:

*coupling a first airbag portion to a second airbag portion to define an enclosed, fluid-retaining space sealed at a seam between the first and second airbag portions;*

*each of the first and second airbag portions being produced by* providing at least two uniaxially oriented films *each comprising a set of uniaxially oriented ribbons, the ribbons in* each of the films being stretched in a single direction to provide the uniaxial orientation [and]*;*

*attaching the uniaxially oriented films together in a state in which* each of the [films having] *sets of ribbons has* a different orientation direction such that the [films] *ribbons in one set* are at a non-parallel angle to [one another] *the ribbons in another set*; and

[weakly] laminating [the films together] *at least one film layer to the uniaxially oriented films*, the airbag being made only from film.

20. The method of claim 19, wherein two *uniaxially oriented* films are provided and the orientation [direction] *directions* of the [films is] *sets of ribbons in the two uniaxially oriented films are* perpendicular to one another.

*21. The method of claim 19, further comprising selecting material of the ribbons from polypropylene, polyethylene, polyamide and polyester.*

*22. The method of claim 19, further comprising selecting material of each of the at least one film layer from polyethylene, polyester, polyamide, and polyurethane.*

*23. The method of claim 19, wherein the step of laminating at least one film layer to the uniaxially oriented films comprises laminating at least one film layer to an inner side of the uniaxially oriented films and laminating at least one film layer to an outer side of the uniaxially oriented films.*

*24. The method of claim 23, further comprising using different film layers on the inner and outer sides of the uniaxially oriented films.*

*25. The method of claim 19, wherein the step of laminating at least one film layer to the uniaxially oriented films comprises laminating at least one film layer to an inner side of the uniaxially oriented films.*

*26. The method of claim 19, wherein the step of laminating at least one film layer to the uniaxially oriented films comprises laminating at least one film layer to an outer side of the uniaxially oriented films.*

*27. The method of claim 19, wherein the step of laminating at least one film layer to the uniaxially oriented films comprises bonding the ribbons and the at least one film layer together.*

*28. The method of claim 19, wherein the step of attaching the uniaxially oriented films together comprises weaving the ribbons together.*

*29. The method of claim 19, wherein the step of attaching the uniaxially oriented films together comprises layering the sets of ribbons on top of one another and then bonding the layered sets of ribbons together.*

* * * * *